United States Patent [19]

Namiki

[11] Patent Number: 6,016,224
[45] Date of Patent: *Jan. 18, 2000

[54] MULTIPLE IMAGE OPTICS SYSTEM

[75] Inventor: Mitsuru Namiki, Hanno, Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,926

[22] Filed: Dec. 18, 1996

[30] Foreign Application Priority Data

Dec. 18, 1995 [JP] Japan .................................. 7-329043
Jan. 22, 1996 [JP] Japan .................................. 8-008536

[51] Int. Cl.[7] .................................................. G02B 27/10
[52] U.S. Cl. ................................... 359/619; 359/626
[58] Field of Search ............................ 359/620, 621, 359/626, 619, 622, 618

[56] References Cited

U.S. PATENT DOCUMENTS

| | | | |
|---|---|---|---|
| 5,151,790 | 9/1992 | Takatori | 359/619 |
| 5,307,207 | 4/1994 | Ichihara | 359/619 |
| 5,319,496 | 6/1994 | Jewell et al. | 359/626 |
| 5,581,408 | 12/1996 | Schumtz et al. | 359/621 |

OTHER PUBLICATIONS

Akiba et al, "Image multiplexer using a planar microlens array", *Applied Optics*, vol. 29, No. 28, Oct. 1, 1990, pp. 4092–4097.

Optical Review vol. 1, No. 2 (1994), pp. 248–253 Automatic Design of a One–To–Many Optical–Interconnects Lens System Using Asperics, F.J. Renero–Carrillo et al.

*Primary Examiner*—Georgia Epps
*Assistant Examiner*—Jordan M. Schwartz
*Attorney, Agent, or Firm*—Pillsbury Madison & Sutro LLP

[57] ABSTRACT

The present invention provides a multiple image optics system which is usable for color images comprising an increased number of pixels and with white light sources as well, and enables high-speed operation processing, and which includes an object-side lens group 1 and an image-side lens array 2 with lens elements 21 arranged at a constant pitch interval, and satisfies a relation $0.8 \leq q/p \leq 1.0$ where p represents an intercentral distance between any replicated input image 41 within an array of input images replicated on a back focal plane of the image-side lens array 2 and a replicated input image 42 nearest thereto, and q is a size of one replicated input image in the intercentral distance direction.

6 Claims, 16 Drawing Sheets

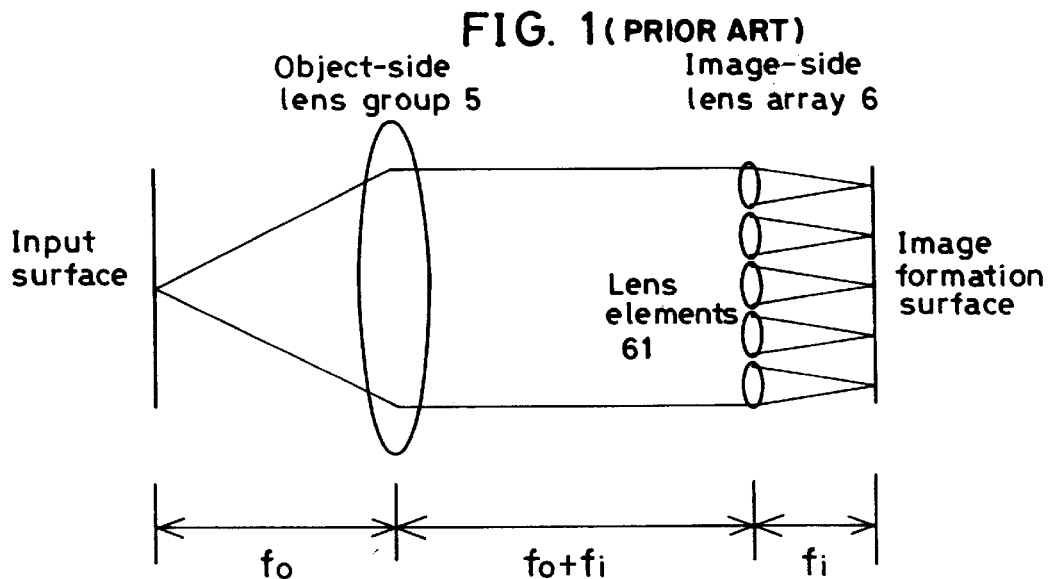
FIG. 1 (PRIOR ART)
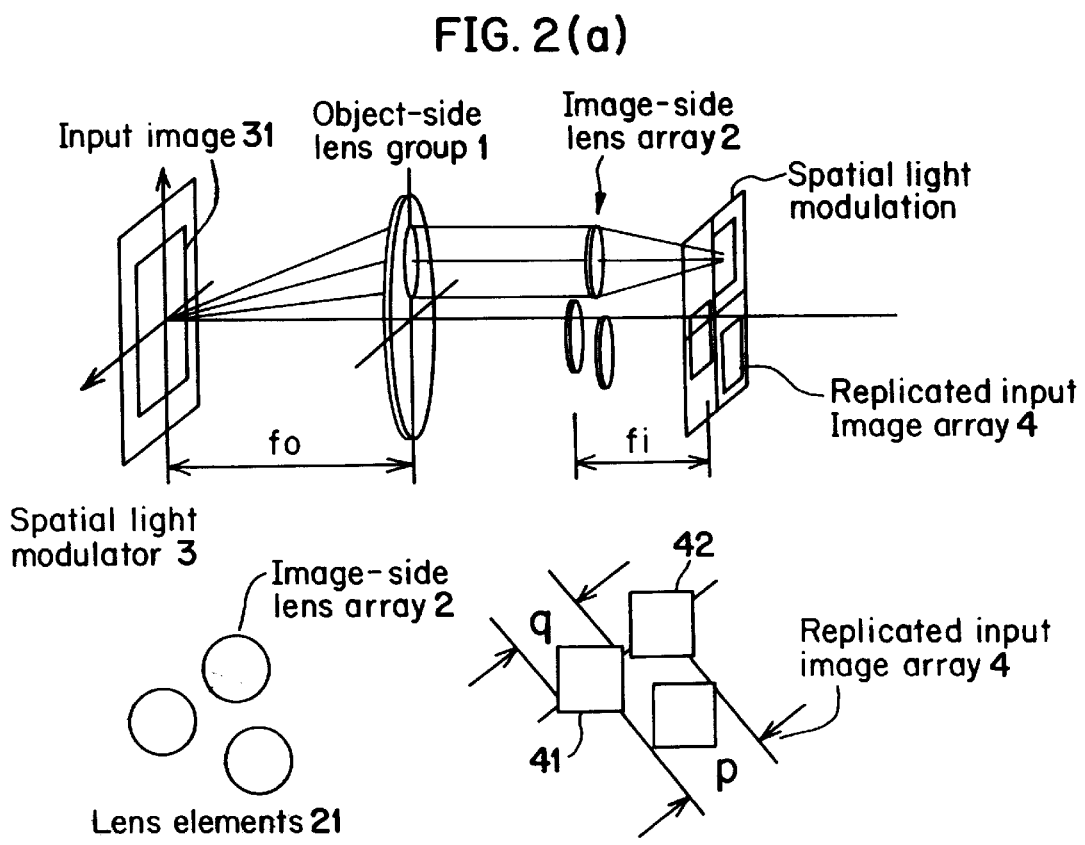

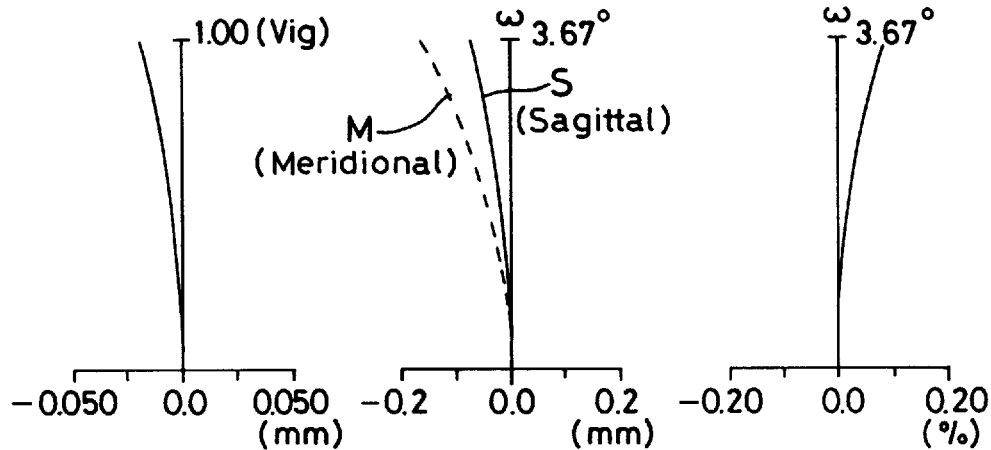

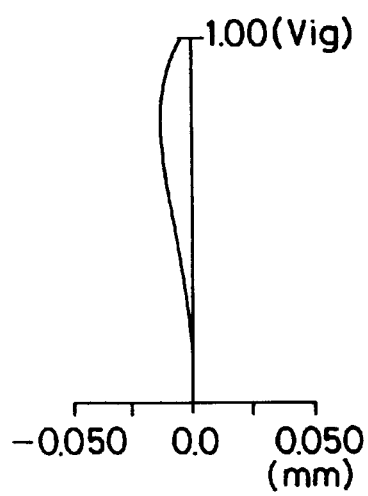 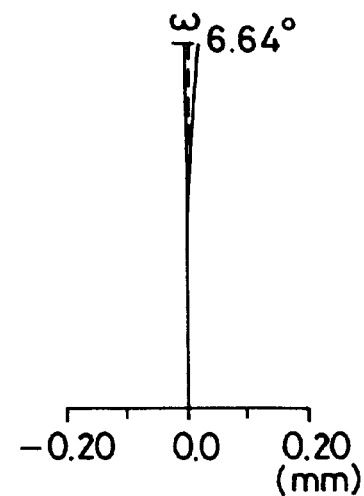 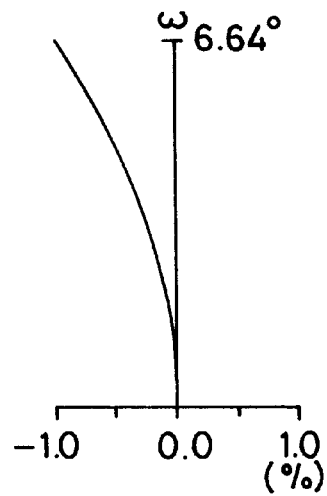
FIG.11(a)   FIG.11(b)   FIG.11(c)
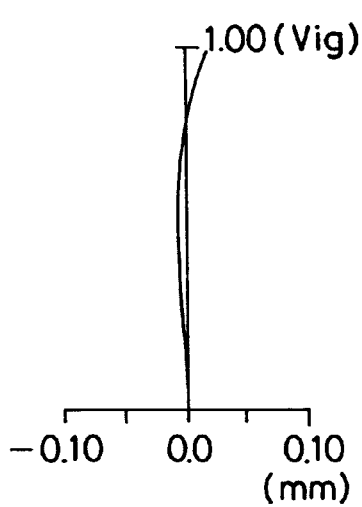 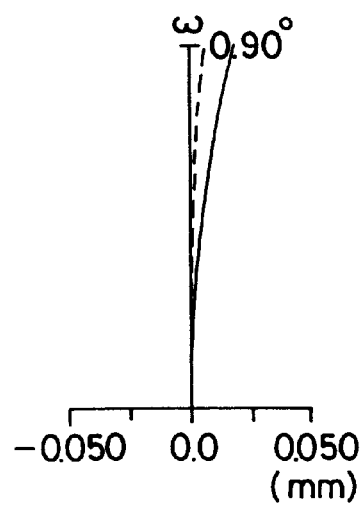 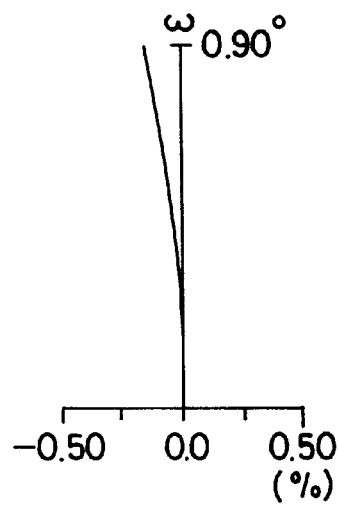
FIG.12(a)   FIG.12(b)   FIG.12(c)

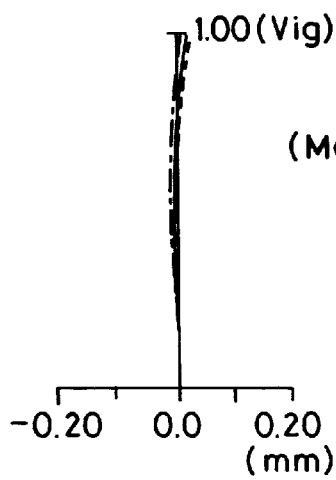
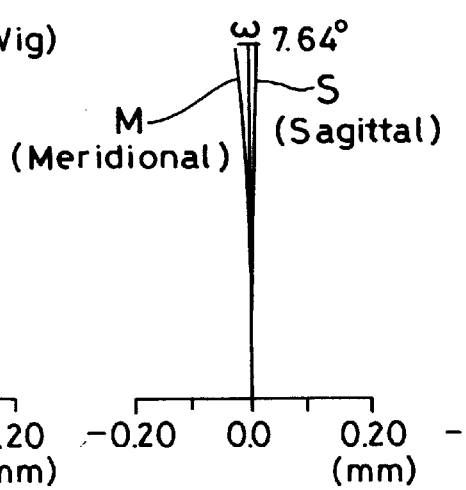
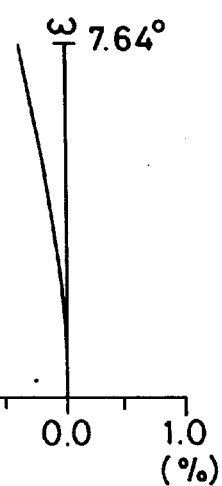
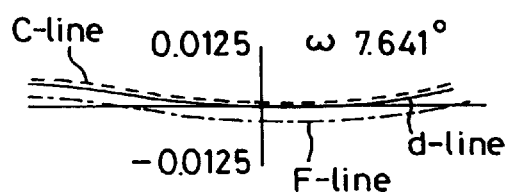
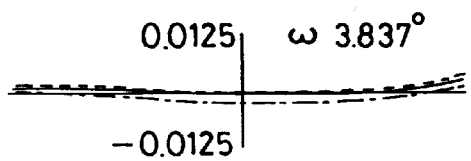
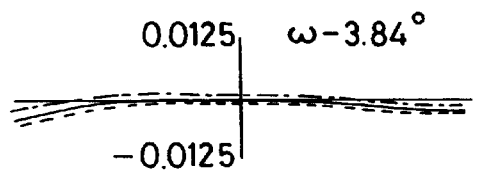
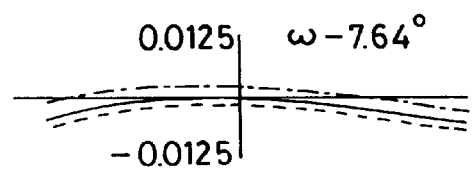
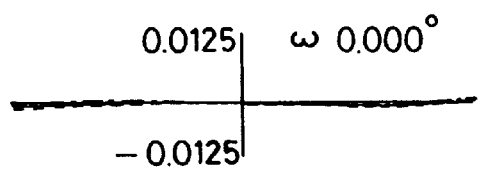

FIG.16(a)
FIG.16(b)
FIG.16(c)
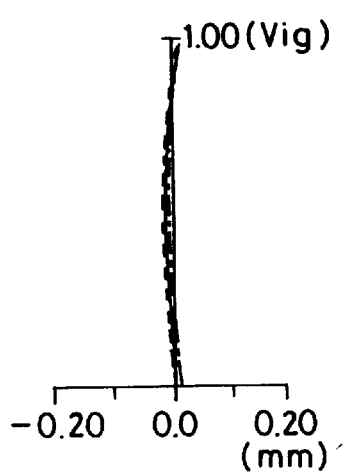
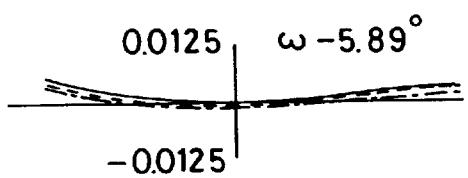
FIG.16(d)
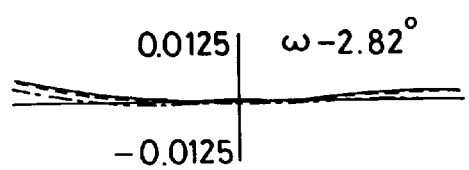
FIG.16(e)
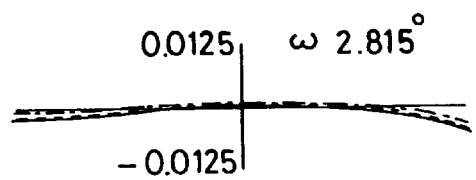
FIG.16(f)
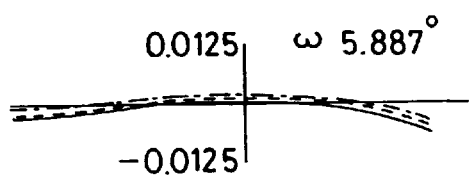
FIG.16(g)
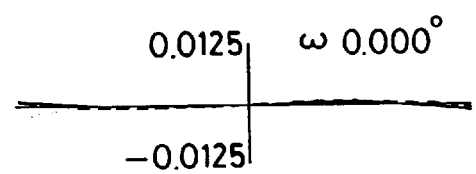
FIG.16(h)

MULTIPLE IMAGE OPTICS SYSTEM

BACKGROUND OF THE INVENTION

The present invention relates generally to a multiple image optics system, and more particularly to a multiple image optics system that enables a plurality of images to be parallel-processed for image processing or in neural networks.

To process a collection of information such as an image, studies have been intensively made of high-speed operation enabling computers. Since computer processing is in itself one-dimensional, it is required for high-speed processing of a collection of two-dimensional information such as an image that the processing speed of electronic circuits themselves be increased. However, it appears that some breakthrough in the processing speed of electronic circuits is hereafter not expectable because current electronic circuits have already been run at virtually maximum speed. For this reason, studies of parallel computers enabling parallel operation by use of a plurality of electronic circuits or electronic computers are being promoted. However, these studies are not so practical because interconnection delays or other problems arise from the need of making parallel connections between a plurality of electronic circuits or electronic computers.

On the other hand, light enables a variety of operations via modulation of amplitude, phase, frequency, polarization, and so on, and is very excellent in the high-speed and parallel processing capability. There is thus a possibility that light may be applied to high-speed and parallel processing of two-dimensional information, which is hardly achievable with electronic computers. In particular, parallel processing run on such a multiple image optics system as proposed in "OPTICAL REVIEW", Vol. 1, No. 2 (1994), pp. 248–253, "Automatic Design of One-To-Many Optical-Interconnections Lens System Using Aspherics" and illustrated in FIG. 1 is very effective for the high-speed capability. This multiplex image optics system is made up of a lens group 5 located on an object side thereof and a lens array 6 located on an image side thereof, said lens array 6 comprising lens elements 61, each having an optical axis parallel with the optical axis of the object-side lens group 5, which are two-dimensionally arranged at a constant pitch within a plane vertical to the optical axis of the object-side lens group 5. An input image is positioned in the vicinity of a front focal plane of the object-side lens group 5; light beams transmitting through the object-side lens group 5 are converted into parallel light beams to form an image in the vicinity of a back focal plane of each of the lens elements 61 in the image-side lens array 6, so that the input image can be replicated. This design is primarily characterized in that the effective F-number is minimized with the highest resolution because parallel light is incident on the image-side lens array 6, and in that there is no appreciable difference in how aberrations occur at the respective lens elements 61 because the optical axis of the image-side lens array 6 is parallel with that of the object-side lens group 5.

Image processing or neural networks require multiplexing for the purpose of increasing the quantity of information to be processed, and the speed of operation processing. So far, devices capable of controlling image displays by electrical or optical addresses such as spatial light modulators have been used as image display devices. In view of resolution and size, however, existing spatial light modulators and such do not have enough capability of displaying a plurality of images having a large quantity of information. When a plurality of images are concurrently displayed on a write surface of a spatial light modulator or the like, an area allocated to one image is naturally small. To increase the quantity of imagewise information as much as possible, therefore, it is required to make as full use of an allocated area on the write surface as possible. With a conventional multiple image optics system, however, it is substantially impossible to display an image having a large quantity of information because no full use is made of an area allocated to one image when displaying a plurality of images. Another problem with the conventional system is that it is impossible to increase the degree of multiplexing by increasing the number of lens elements forming an image-side lens array, because the ratio of the effective aperture of an object-side lens group with respect to the effective aperture of the image-side lens array is not large. Yet another problem with the conventional system is that it is designed to process monochromatic images alone; it cannot be used for color images or with white light sources because of being not well corrected for chromatic aberrations.

SUMMARY OF THE INVENTION

In view of such problems associated with the prior art, it is an object of the present invention to achieve a multiple image optics system which can be used for color images and with white light sources, and enables high-speed operation processing as well.

According to the present invention, the aforesaid object is achieved by the provision of a multiple image optics system including an object-side lens group on an object side thereof and a lens array on an image side thereof, and satisfying the following condition (1):

$$0.8 \leq q/p \leq 1.0 \tag{1}$$

where p represents the intercentral distance between any replicated input image within an array of input images replicated on a back focal plane of the image-side lens array and a replicated input image nearest thereto, and q is the length of a segment of a line passing through centers of both said replicated input images, which is cut off by one replicated input image.

Preferably in this case, each of the lens elements, of which the image-side lens array is composed, satisfies the following condition (2):

$$0.08 < d/r_a < 0.1 \tag{2}$$

where d is the lens thickness of each lens element, and $r_a$ is the radius of curvature of an object-side surface of each lens element.

Preferably, the image-side lens array is constructed using as the lens elements a radial type of graded index lenses represented by the following equation (a) and satisfying the following condition (3):

$$N(r) = N_{00} + N_{10}r^2 + N_{20}r^4 + \ldots \tag{a}$$

$$N_{10} < 0 \tag{3}$$

where r is the distance of a radial type of graded index lens, as viewed from an optical axis thereof in a radial direction, $N(r)$ is the refractive index of the graded index lens at the distance r, $N_{00}$ is the refractive index of the graded index lens on the optical axis thereof, and $N_{10}$ and $N_{20}$ are the second- and fourth-order refractive index profile coefficients of the graded index lens, respectively.

Preferably, the image-side lens array is constructed using as the lens elements a radial type of graded index lenses represented by the following equation (a) and satisfying the following condition (4):

$$N(r)=N_{00}+N_{10}r^2+N_{20}r^4+\ldots \quad (a)$$

$$-1<\phi_s/\phi_m<-0.6 \quad (4)$$

where r is the distance of the radial type of graded index lens, as viewed from an optical axis thereof in a radial direction, N(r) is the refractive index of the radial type of graded index lens at the distance r, $N_{00}$ is the refractive index of the radial type of graded index lens on the optical axis thereof, $N_{10}$ and $N_{20}$ are the second- and fourth-order refractive index profile coefficients of the radial type of graded index lens, respectively, and $\phi_s$ and $\phi_m$ are the refracting powers of the radial type of graded index lens by surface and medium, respectively.

Preferably, the image-side lens array is constructed using as the lens elements a radial type of graded index lenses represented by the following equation (a) and satisfying the following condition (5):

$$N(r)=N_{00}+N_{10}r^2+N_{20}r^4+\ldots \quad (a)$$

$$V_{10}^{-1}<V_{00}^{31\ 1} \quad (5)$$

where r is the distance of a radial type of graded index lens, as viewed from an optical axis thereof in a radial direction, N(r) is the refractive index of the radial type of graded index lens at the distance r, $N_{00}$ is the refractive index of the radial type of graded index lens on the optical axis thereof, $N_{10}$ and $N_{20}$ are the second- and fourth-order refractive index profile coefficients of the radial type of graded index lens, respectively, and $V_{00}$ and $V_{10}$ are the dispersions of the radial type of graded index lens, as given by the following equations (b) and (c), respectively:

$$V_{00}=(N_{00d}-1)/(N_{00F}-N_{00C}) \quad (b)$$

$$V_{10}=N_{10d}/(N_{10F}-N_{10C}) \quad (c)$$

where $N_{00d}$, $N_{00F}$, and $N_{00C}$ are the axial refractive indices of the radial type of graded index lens with respect to d-, F-, and C-lines, respectively, and $N_{10d}$, $N_{10F}$, and $N_{10C}$ are the second-order refractive index profile coefficients of the radial type of graded index lens with respect to d-, F-, and C-lines, respectively.

Preferably, the multiple image optics system according to the present invention satisfies the following condition (6):

$$20<NA_O\cdot f_O/(NA_I\cdot f_I) \quad (6)$$

where $NA_O$ and $NA_I$ are the numerical apertures of the object-side lens group and the image-side lens array, respectively, and $f_O$ and $f_I$ are the focal lengths of the object-side lens group and the image-side lens array, respectively.

An account will now be given of why the aforesaid arrangements are used, and how they act.

One exemplary multiple image optics system according to the present invention is schematically shown in FIG. 2. More exactly, FIG. 2(a) is a schematic showing a general arrangement of the image optics system, FIG. 2(b) is a front schematic showing a replicated input image array 4, and FIG. 2(c) is a front schematic showing an image-side lens array 2. As illustrated, the multiple image optics system according to the present invention is made up of an object-side lens group 1 and the image-side lens array 2. The numerical aperture (NA) and focal length of the object-side lens group 1 are represented by $NA_O$ and $f_O$ respectively, and the numerical aperture and focal length of the image-side lens array 2 by $NA_I$ and $f_I$, respectively. An input image 31 displayed on a spatial light modulator 3 is spaced away from the object-side lens group 1 by the length $f_O$ or, in another parlance, is located in the vicinity of a front focal plane thereof, so that light beams transmitting through the object-side lens group 1 are converted into parallel light which is in turn incident on each of lens elements 21 in the image-side lens array 2. The image-side lens array 2 is constructed from two-dimensionally arranged lens elements 21 having identical performance, and so the optical axes of the lens elements 21 are all parallel with the optical axis of the object-side lens group 1. At an image formation surface of the image-side lens array 2, therefore, the replicated input image array 4 is in good alignment with the lens elements 21 in the image-side lens array 2. Here let p denote an intercentral distance between any replicated input image 41 and a replicated input image 42 nearest thereto, and q denote a length of a segment of a line connecting the centers of both the images, which is cut off by the replicated input image 41 or 42. To avoid any overlapping of the replicated input images 41 and 42 with each other on this segment, it is required that q<p. The resolution of an existing spatial light modulator used as a spatial light modulator 5 for displaying the replicated input image array 4 is not high, and so it is required to make full use of an area allocated to one image so that a plurality of images each having a large quantity of information can be displayed. In other words, the following condition (1) should be satisfied to make as large an image as possible.

$$0.8 \leq q/p \leq 1.0 \quad (1)$$

If the replicated input image 41 satisfies this condition, it is then possible to make effective use of an area allocated to one image on the spatial light modulator 5.

It is here to be noted that when processing an image of such size as defined by condition (1), it is impossible for reasons of fabrication, regulation, and cost to increase the number of lenses of which each lens element 21 in the image-side lens array 2 is composed. Now consider that each lens element 21 in the image-side lens array 2 is composed of one lens. In this case, however, much difficulty is involved in making correction for aberrations. When the lens element 21 is composed of one uniform refractive lens, therefore, it is required to satisfy the following condition (2):

$$0.08<d/r_a<0.1 \quad (2)$$

where d is the lens thickness of each lens element 21 in the image-side lens array 2, and $r_a$ is the radius of curvature of a first (object-side) surface of each lens element 21 in the image-side lens array 2. A lens having a larger thickness or with the first surface having a smaller radius of curvature is not worthy of practical use, because various aberrations occur due to its increased refracting power. Even with a lens element having a uniform refractive index profile, provided that it satisfies condition (2), it is possible to achieve sufficient performance because an increased resolution can be obtained with the elimination of various aberrations.

Making the overall system compact without varying the quantity of information an image has may be achieved by shortening the focal lengths of the object-side lens group 1 and image-side lens array 2. However, image size cannot be reduced because the image-displaying spatial light modulator 5 has a constant resolution. To process images having the same quantity of information with lenses having short focal lengths, therefore, the lens elements 21 in the image-side lens array 2 must exhibit sufficient over a wide range of field angle. However, when lens elements 21 having a uniform refractive index profile are used for the image-side lens array 2, much difficulty is experienced in correcting for various aberrations at a wide field angle. In the present invention, therefore, a radial type of graded index lenses with radially varying refractive indices, which are superior in optical performance to lenses having a uniform refractive index profile, are used for the lens elements 21 in the image-side lens array 2, thereby making the overall system compact while condition (1) is satisfied. A radial type of graded index lens has a refractive index profile represented by the following equation (a):

$$N(r) = N_{00} + N_{10} r^2 + N_{20} r^4 + \ldots \tag{a}$$

where $N(r)$ is the refractive index of the radial type of graded index lens at a position spaced away from an optical axis thereof by a distance r, $N_{00}$ is the axial refractive index of the radial type of graded index lens, and $N_{10}$ and $N_{20}$ are the second- and fourth-order refractive index profile coefficients of the radial type of graded index lens, respectively.

As is well known in the art, a radial type of graded index lens has a Petzval sum (or PTZ) represented by the following equation (d):

$$PTZ = \phi_s/N_{00} + \phi_m/N_{00}^2 \tag{d}$$

where $$\phi_s = (N_{00}-1)/(1/r_1 31\ 1/r_2) \tag{e}$$

$$\phi_m = -2N_{10} \cdot d \tag{f}$$

Here d is the lens thickness of the radial type of graded index lens, and $r_1$ and $r_2$ are the radii of curvature of the object- and image-side surfaces of the radial type of graded index lens. From equation (d), wherein the denominator of the second term is proportional to the square of $N_{00}$, it is found that the Petzval sum of the radial type of graded index lens is allowed to be smaller than that of an uniform refractive lens having the same refracting power by increasing the refracting power of the medium thereof. From equation (f) it is also found that the radial type of graded index lens is allowed to have a positive refracting power by conforming to the following condition (3):

$$N_{10} < 0 \tag{3}$$

By complying with condition (3), the radial type of graded index lens can have a Petzval sum smaller than that of a lens having the same refracting power and a uniform refractive index profile, and so provide a lens system having a short focal length and good optical performance, which is hardly obtainable with a lens having a uniform refractive index profile.

Much more improved optical performance is achievable by complying with the following condition (4):

$$-1 < \phi_s/\phi_m < -0.6 \tag{4}$$

If condition (4) is satisfied, the Petzval sum of the graded index lens can then be as a whole reduced by a negative refracting power by surface and a positive refracting power by medium, so that various aberrations inclusive of curvature of field can be well corrected.

To achieve a multiple image optics system usable for color images composed of many pixels or with white light sources, the optics system must have been well corrected for chromatic aberration. A conventional lens system may be corrected for chromatic aberration by using a combination of several lenses. However, it is impossible to increase the number of lenses forming each lens element in a lens array for cost and other reasons. Thus, much difficulty is experienced in making correction for chromatic aberration occurring at the lens array. However, the radial type of graded index lens having a refractive index profile from the optical axis in a radial direction is capable of making correction for chromatic aberration even when it is composed of one lens.

As is well known in the art, axial chromatic aberration (or PAC) occurring at a radial type of graded index lens is represented by the following equation (g):

$$PAC = K(\phi_s/V_{00} + \phi m/V_{10}) \tag{g}$$

where K is a constant depending on ray height and final paraxial ray angle, and $V_{00}$ and $V_{10}$ are the dispersions of the radial type of graded index lens, respectively, which are represented by the following equations (b) and (c):

$$V_{00} = (N_{00d} - 1)/(N_{00F} - N_{00C}) \tag{b}$$

$$V_{10} = N_{10d}/(N_{10F} - N_{10C}) \tag{c}$$

where $N_{00d}$, $N_{00F}$, and $N_{00C}$ are the axial refractive indices of the radial type of graded index lens with respect to d-, F-, and C-lines, respectively, and $N_{10d}$, $N_{10F}$, and $N_{10C}$ are the second-order refractive index profile coefficients of the radial type of graded index lens with respect to d-, F-, and C-lines, respectively.

From equation (g), it is found for in order that the axial chromatic aberration (or PAC) of the radial type of graded index lens to be smaller than that of an uniform refractive lens having the same refracting power, the graded index lens must comply with the following condition (5):

$$V_{10}^{-1} < V_{00}^{-1} \tag{5}$$

If the radial type of graded index lens complies with condition (5), as mentioned above, it is then possible to make the axial chromatic aberration thereof smaller than that of an uniform refractive lens having the same refracting power.

It is very favorable that a multiple image optics system has as high a degree of multiplexing as possible because the higher the degree of multiplexing, the more the number of images will be parallel-processed. To achieve this, it is required that the ratio of the pupil diameter of the object-side lens group 1 with respect to that of each lens element 21 in the image-side lens array 2 be large. That is, the condition (6) must be satisfied, as follows:

$$20 < NA_O \cdot f_O/(NA_I \cdot f_I) \tag{6}$$

If condition (6) is satisfied, it is then possible to increase the degree of multiplexing of the image-side lens array 2, thereby achieving high-speed processing.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is a general schematic of a multiple image optics system.

FIG. 2(a), (2b) and (2c) are a general schematic illustrations of one exemplary multiple image optics system according to the present invention.

FIG. 9 is an aberration diagram of the multiple image optics system according to Example 1.

FIG. 10 is an aberration diagram of the multiple image optics system according to Example 2.

FIG. 11 is an aberration diagram of the multiple image optics system according to Example 3.

FIG. 12 is an aberration diagram of the multiple image optics system according to Example 4.

FIG. 13(a)–13(b) are aberration diagrams of the multiple image optics system according to Example 5.

FIG. 16(a)–16(b) are aberration diagrams of the multiple image optics system according to Example 8.

DESCRIPTION OF THE PREFERRED EMBODIMENTS

A detailed account will now be given of Examples 1 to 11 of the multiple image optics system according to the present invention.

Figure 3:
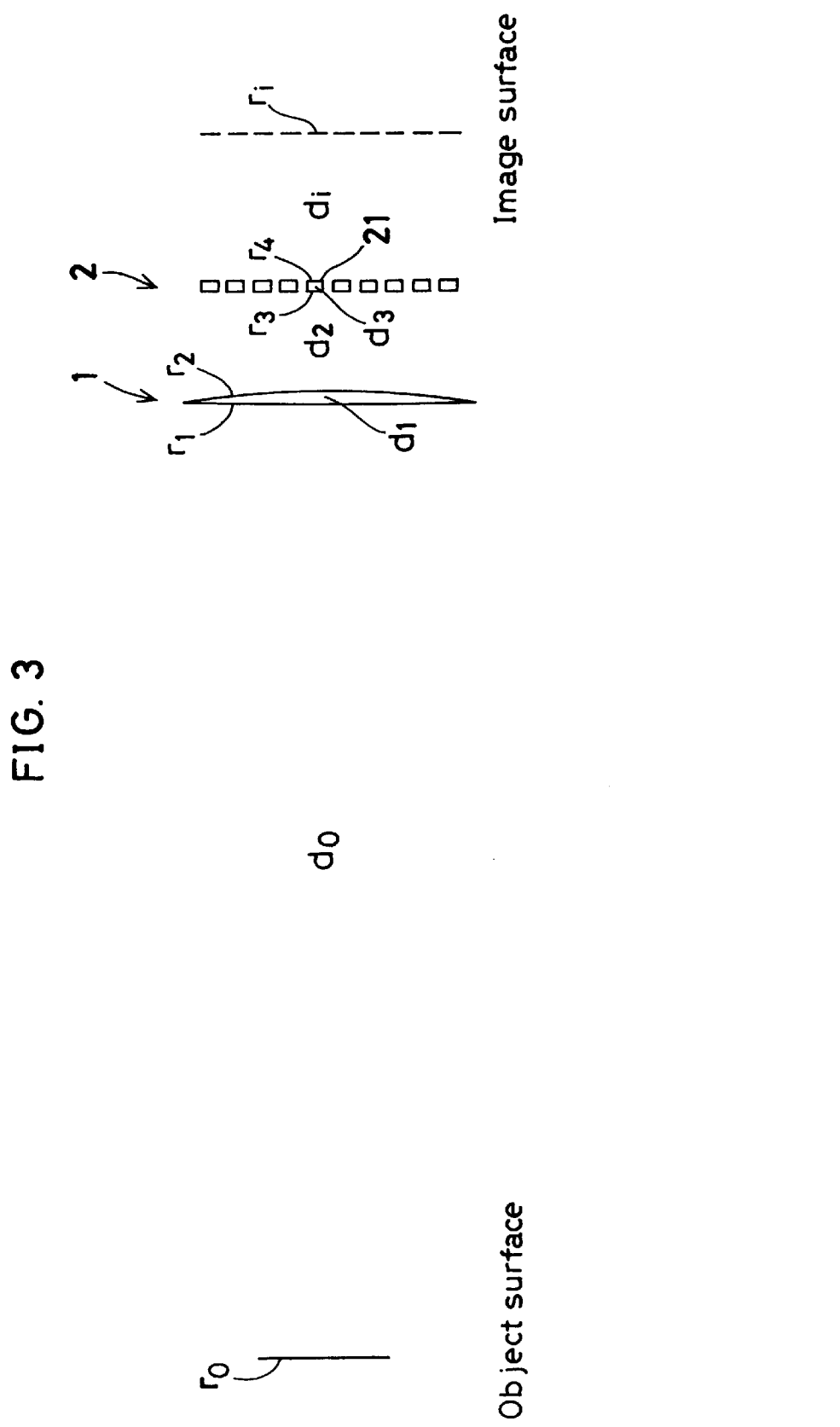
FIG. 3 is a sectional schematic of the multiple image optics system according to Example 1.

Numerical data on each example will be enumerated later. A section of the multiple image optics system according to Example 1 is shown in FIG. 3. In this example, an object-side lens group 1 is composed of a single lens, and an image-side lens array 2 is made up of lens elements 21 having a uniform refractive index profile, and two-dimensionally arranged within a plane vertical to the optical axis of the object-side lens group 1.

In Example 1, q/p=0.8 lying in the range defined by condition (1), although the size of replicated input images is smaller than the maximum size determined by an imagewise pitch interval. FIG. 9 is an aberration diagram of this multiple image optics system, from which it is found that various aberrations are well corrected, and so high optical performance is achieved. This is because the influences of various aberrations are eliminated by complying with condition (2), although the lens elements 21 in the image-side lens array 2 have a uniform refractive index profile.

The NA and focal length of the object-side lens group 1 are 0.15 and 100 mm, respectively, while the NA and focal length of the image-side lens array 2 are 0.044 and 15.86 mm, respectively, and so the ratio of the effective aperture of the object-side lens group 1 with respect to those of the lens elements 21 in the image-side lens array 2 is 21.49 included in the range defined by condition (6). From this, it is found that a high degree of multiplexing is achieved.

Figure 4:
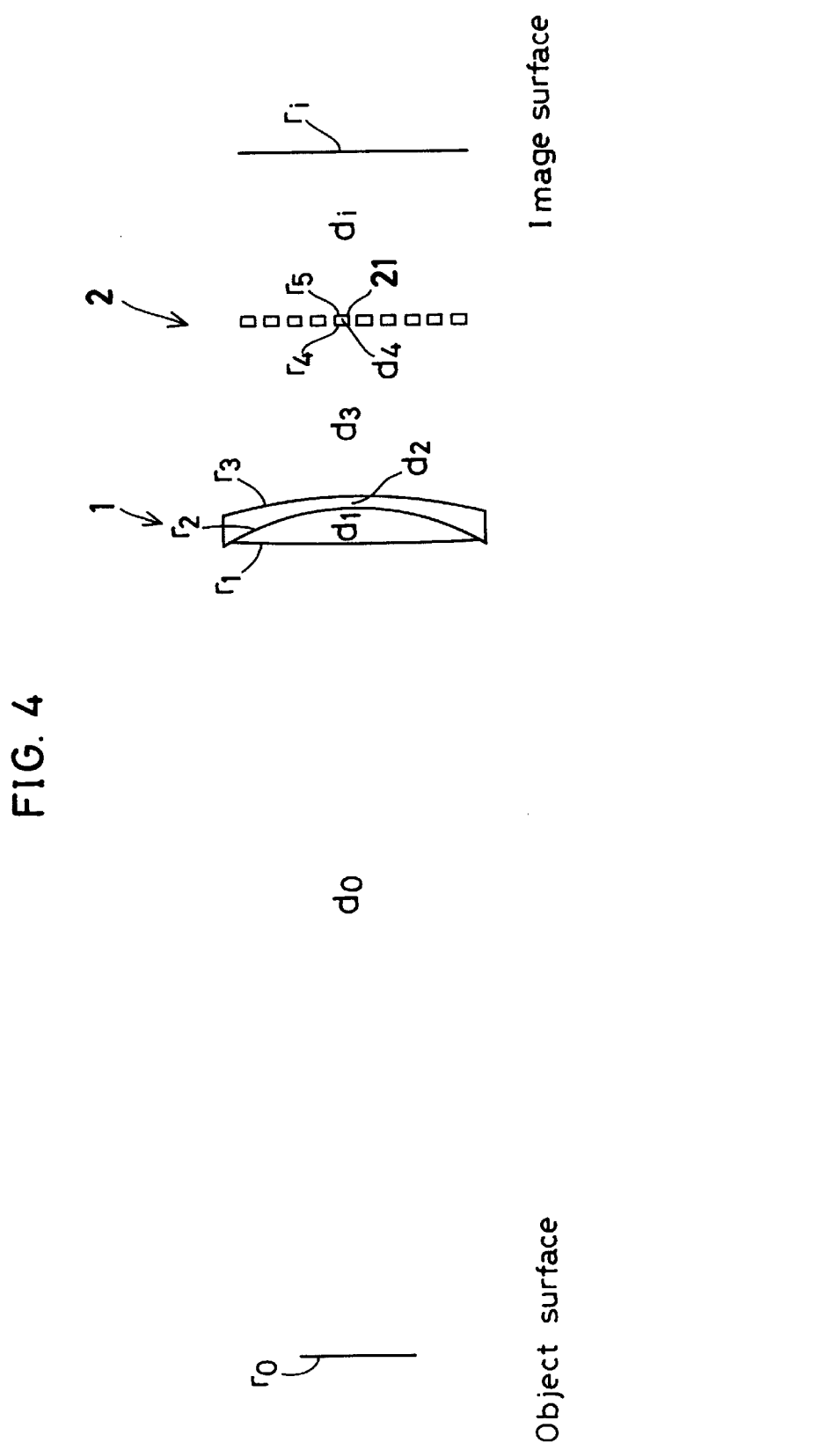
FIG. 4 is a sectional schematic of the multiple image optics system according to Example 2.

A section of the multiple image optics system according to Example 2 is shown in FIG. 4. In this example, an object-side lens group 1 is composed of a doublet made up of a double-convex lens and a negative meniscus lens concave on the object side thereof, and an image-side lens array 2 is made up of lens elements 21 having a uniform refractive index profile as in Example 1, and two-dimensionally arranged within a plane vertical to the optical axis of the object-side lens group 1.

In Example 2, q/p=1.0 lying in the range defined by condition (1), and the size of replicated input images is the maximum size determined by an imagewise pitch interval. FIG. 10 is an aberration diagram of this multiple image optics system, from which it is found that various aberrations are well corrected, and so high optical performance is achieved.

The NA and focal length of the object-side lens group 1 are 0.15 and 100 mm, respectively, while the NA and focal length of the image-side lens array 2 are 0.035 and 20 mm, respectively, and so the ratio of the effective aperture of the object-side lens group 1 with respect to those of the lens elements 21 in the image-side lens array 2 is 21.43 included in the range defined by condition (6). From this, it is found that a high degree of multiplexing is achieved.

Figure 5:
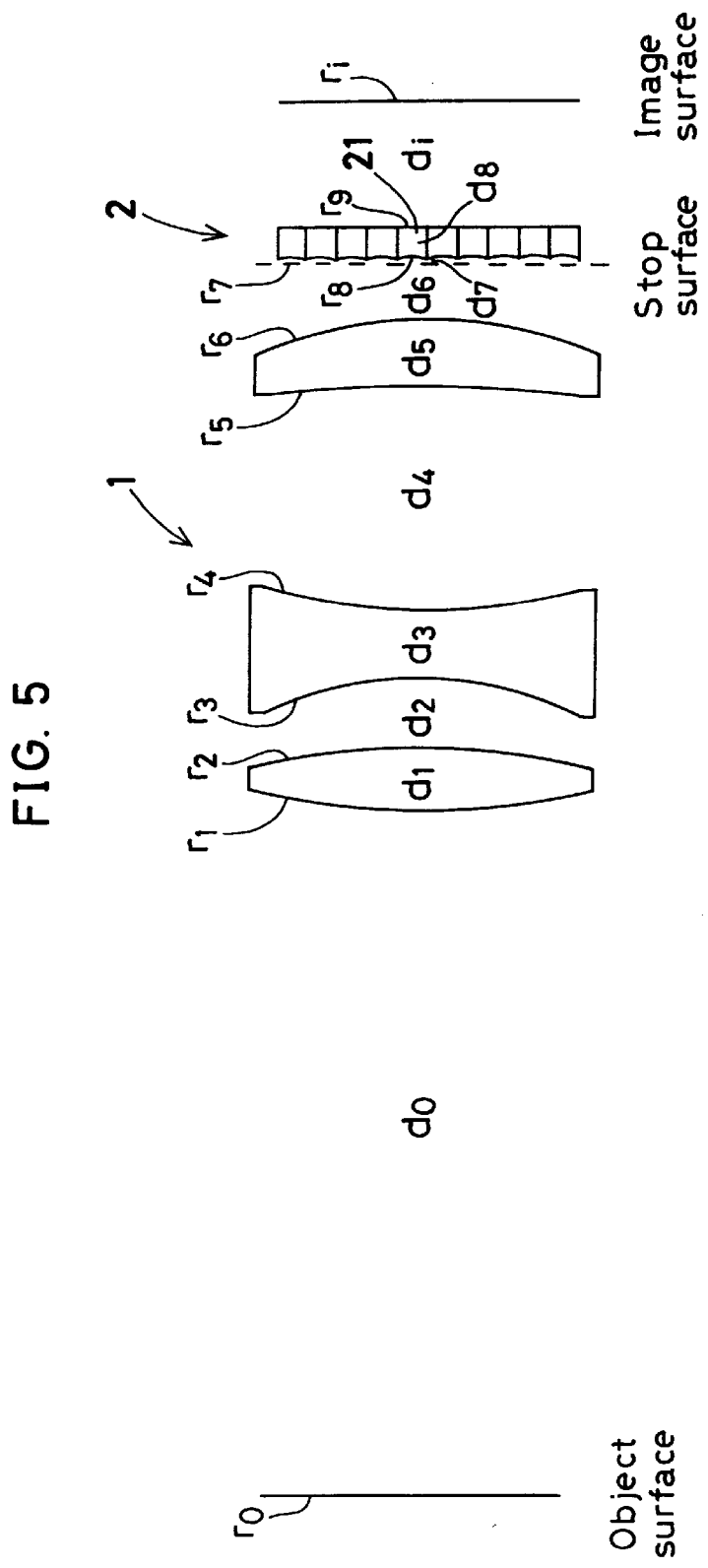
FIG. 5 is a sectional schematic of the multiple image optics system according to Example 3.

A section of the multiple image optics system according to Example 3 is shown in FIG. 5. In this example, an object-side lens group 1 is of a triplet type composed of three lenses, viz., a double-convex lens, a double-concave lens, and a positive meniscus lens concave on the object side thereof, and an image-side lens array 2 is made up of lens elements 21 that are a radial type of graded index lenses in meniscus forms concave on the object sides thereof, said lens elements 21 being two-dimensionally arranged within a plane vertical to the optical axis of the object-side lens group 1.

In Example 3, q/p=1.0 lying in the range defined by condition (1), and the size of replicated input images is the maximum size determined by an imagewise pitch interval. FIG. 11 is an aberration diagram of this multiple image optics system, from which it is found that various aberrations are well corrected, and so high optical performance is achieved. The reason is that the influences of various aberrations are eliminated by composing the lens elements 21 in the image-side lens array 2 of the radial type of graded index lenses conforming to conditions (3) and (4).

The NA and focal length of the object-side lens group 1 are 0.2 and 100 mm, respectively, while the NA and focal length of the image-side lens array 2 are 0.069 and 10 mm, respectively, and so the ratio of the effective aperture of the object-side lens group 1 with respect to those of the lens elements 21 in the image-side lens array 2 is 28.99 conforming well to condition (6). This makes it possible to achieve a high degree of multiplexing. Thus, even when images on the image surface are equal in size to the pitch interval of the image-side lens array 2, high optical performance can be achieved.

Figure 6:
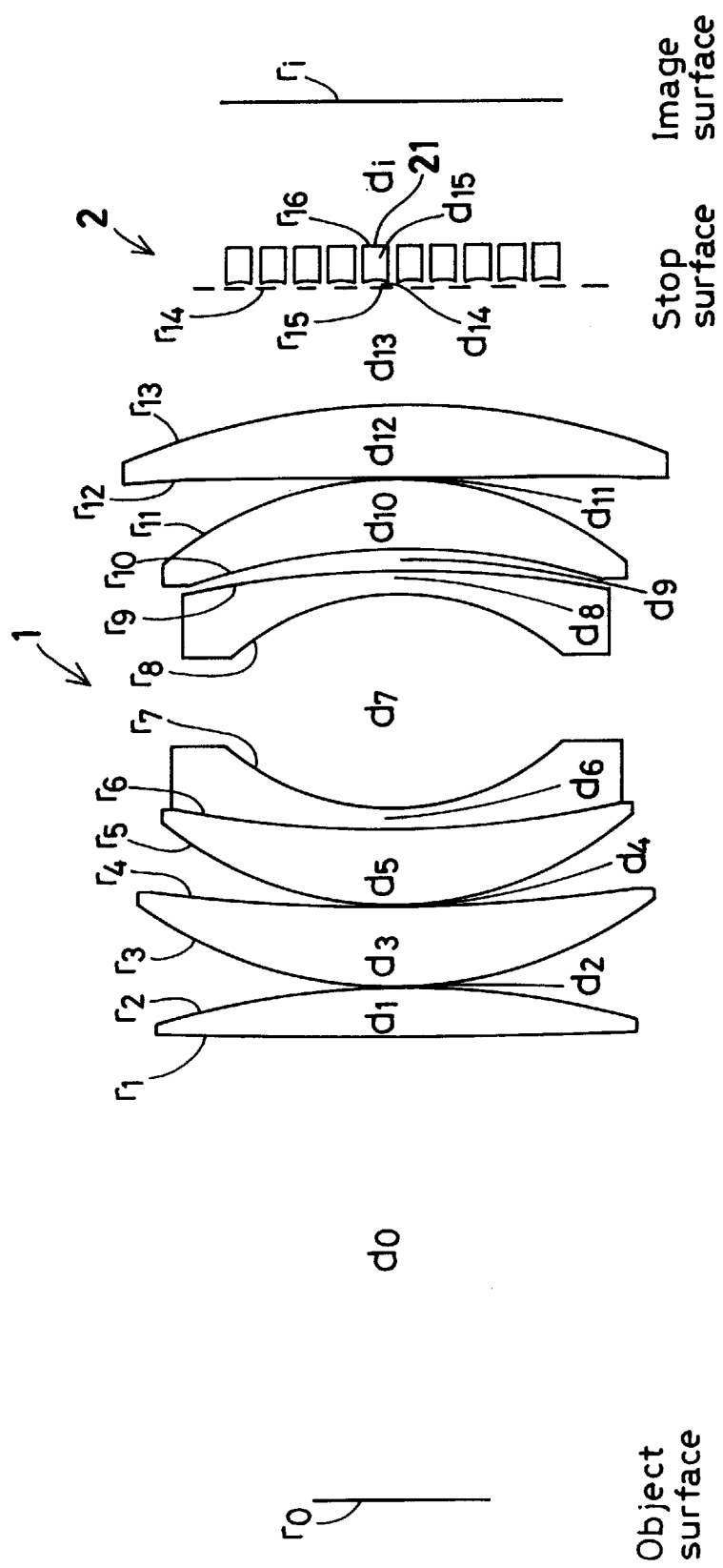
FIG. 6 is a sectional schematic of the multiple image optics system according to Example 4.

A section of the multiple image optics system according to Example 4 is shown in FIG. 6. In this example, an object-side lens group 1 is of a Gauss type composed of seven lenses in all, viz., a double-convex lens, a positive meniscus lens convex on the object side thereof, a doublet made up of a positive meniscus lens convex on the object side thereof and a negative meniscus lens, a negative meniscus lens convex on the image side thereof, a positive meniscus lens convex on the image side thereof, and a positive meniscus lens convex on the image side thereof, said Gauss type providing a large NA optical system with well-corrected various aberrations. An image-side lens array 2 is made up of lens elements 21 that are a radial type of graded index lenses in meniscus forms concave on the object sides thereof, said lens elements 21 being two-dimensionally arranged within a plane vertical to the optical axis of the object-side lens group 1.

In Example 4, q/p=1.0 lying in the range defined by condition (1), and the size of replicated input images is the maximum size determined by an imagewise pitch interval. FIG. 12 is an aberration diagram of this multiple image optics system, from which it is found that various aberrations are well corrected, and so high optical performance is achieved. The reason is that the influences of various aberrations are eliminated by composing the lens elements 21 in the image-side lens array 2 of the radial type of graded index lenses conforming to conditions (3) and (4).

The NA and focal length of the object-side lens group 1 are 0.385 and 52.06 mm, respectively, while the NA and focal length of the image-side lens array 2 are 0.065 and 10.01 mm, respectively, and so the ratio of the effective aperture of the object-side lens group 1 with respect to those of the lens elements 21 in the image-side lens array 2 is 30.77 conforming well to condition (6). This makes it possible to achieve a high degree of multiplexing.

Figure 7:
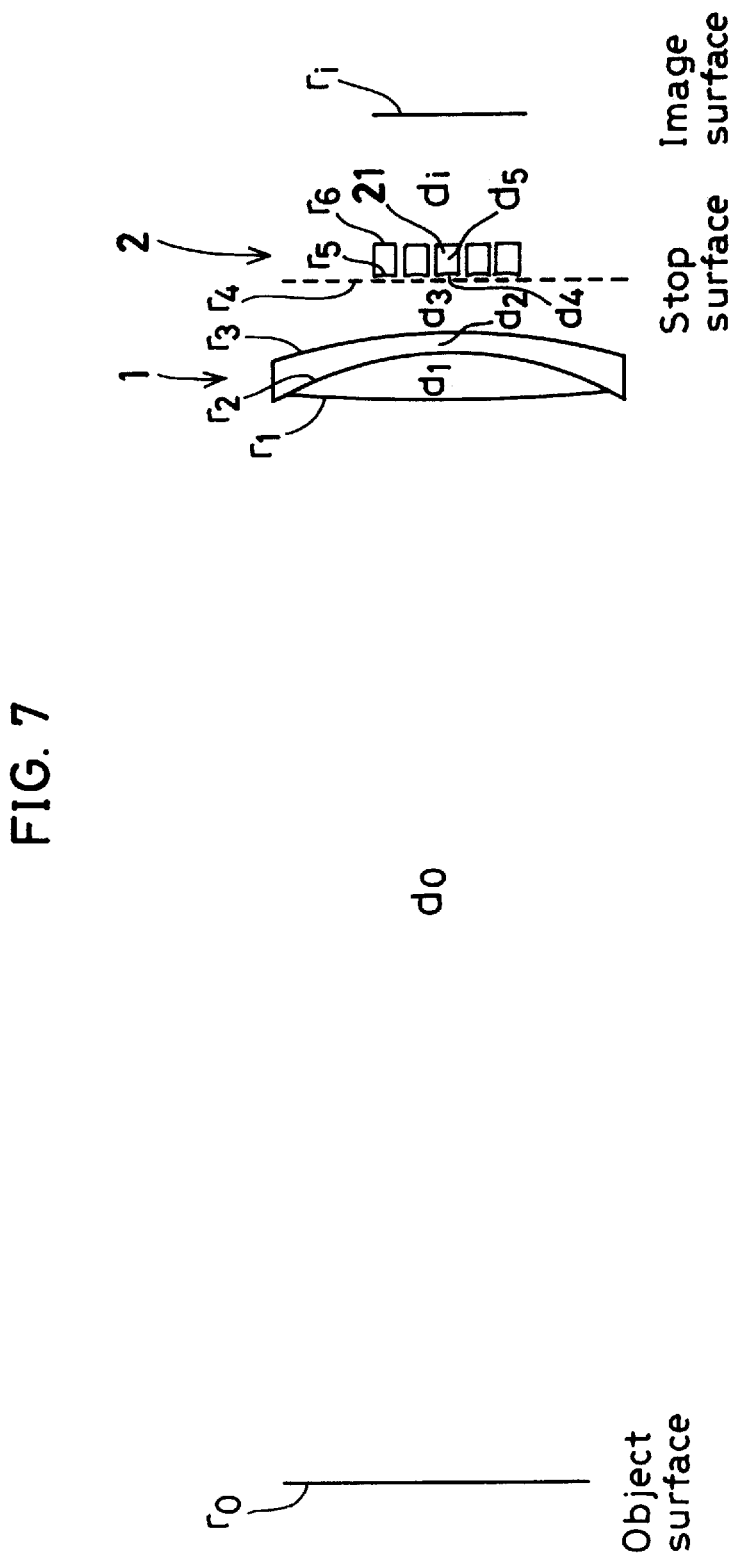
FIG. 7 is a sectional schematic of the multiple image optics system according to Example 5.

A section of the multiple image optics system according to Example 5 is shown in FIG. 7. An object-side lens group 1 is a doublet made up of a double-convex lens and a negative meniscus lens concave on the object side thereof, and an image-side lens array 2 is composed of lens elements 21 that are a radial type of graded index lenses in meniscus forms convex on the images sides thereof. The size of replicated input images satisfies condition (1), so that the number of pixels of an image to be written onto a spatial light modulator 5 or the like can be increased. Furthermore in this case, by conforming to conditions (4) and (5), these lens elements 21 can achieve a multiple image optics system which, albeit being composed of a reduced number of lenses, is well corrected for axial chromatic aberration and Petzval sum. An aberration diagram of this multiple image optics system is shown in FIG. 13, from which it is found that aberrations are well corrected.

Figure 8:
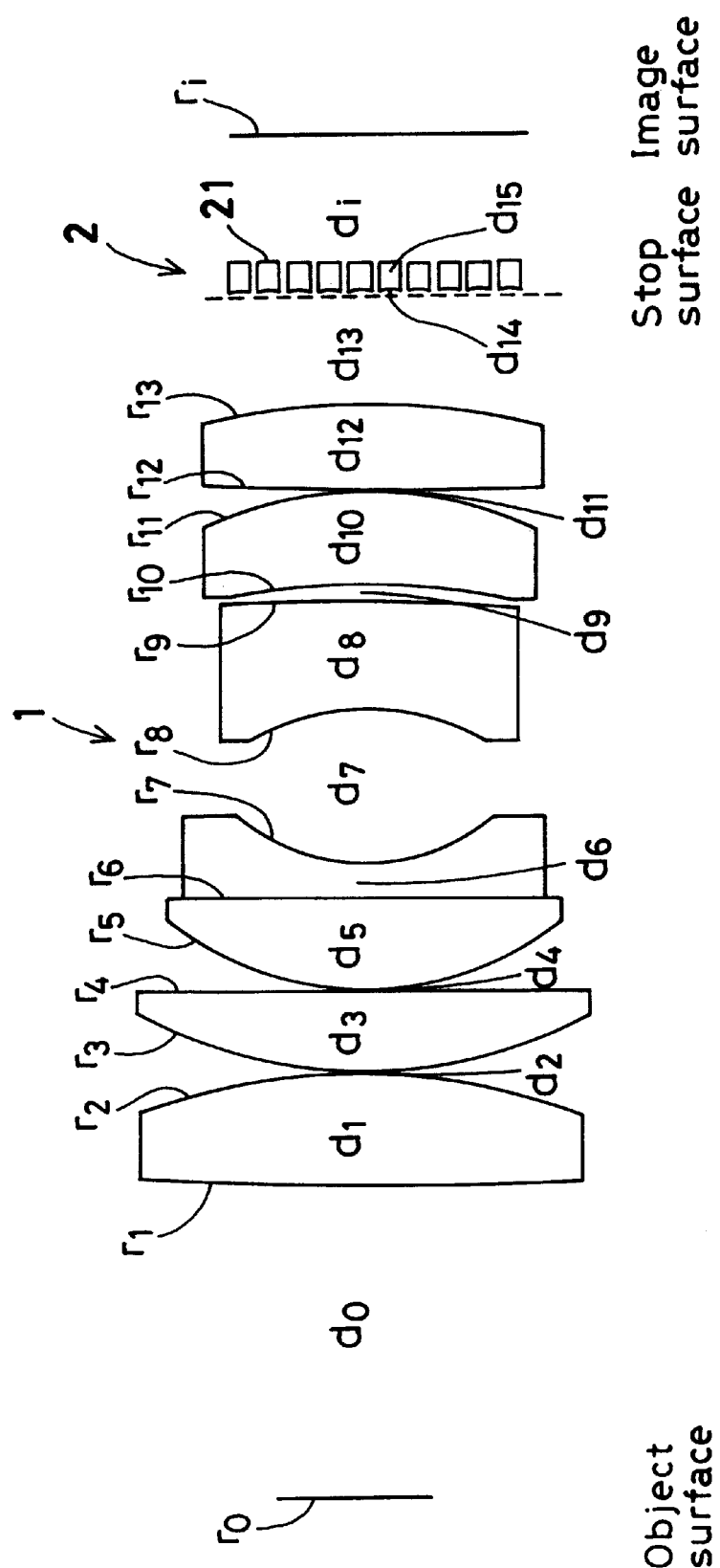
FIG. 8 is a sectional schematic of the multiple image optics systems according to Examples 6–11.
Figure 14A:
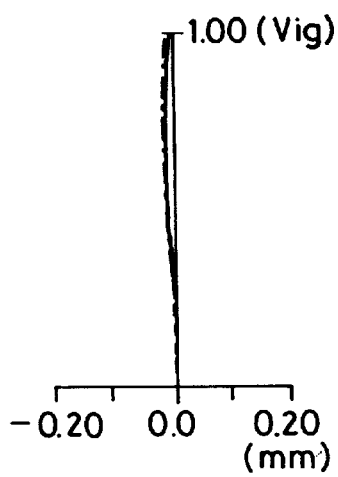
FIG. 14(a)–14(b) are aberrations diagram of the multiple image optics system according to Example 6.
Figure 14B:
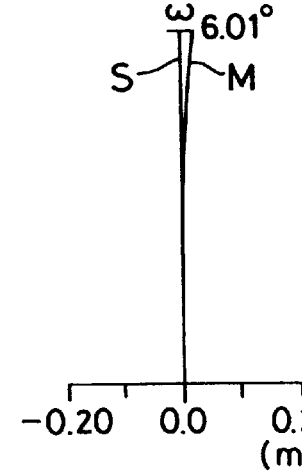
Figure 14C:
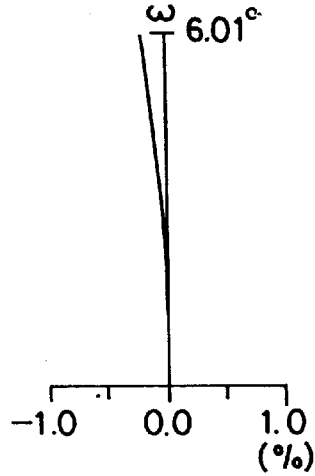
Figure 14D:
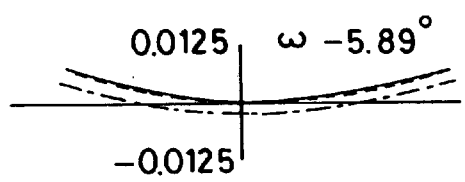
Figure 14E:
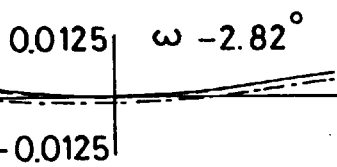
Figure 14F:
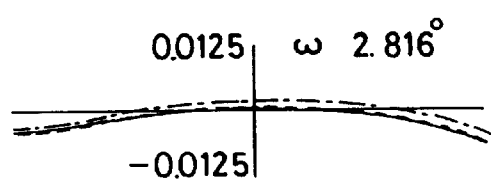
Figure 14G:
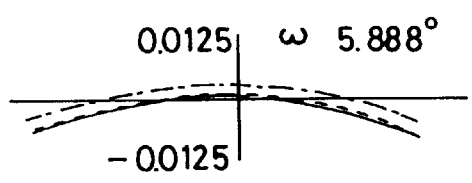
Figure 14H:
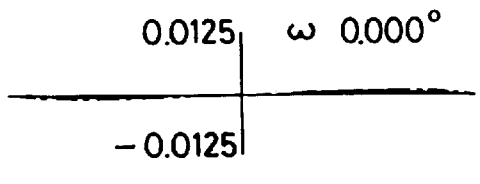
Figure 15A:
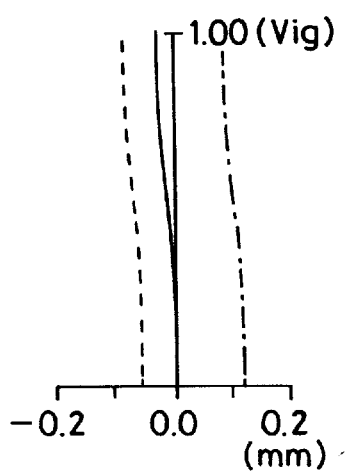
FIG. 15(a)–15(b) are aberration diagrams of the multiple image optics system according to Example 7.
Figure 15B:
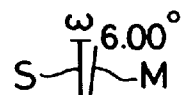
Figure 15C:
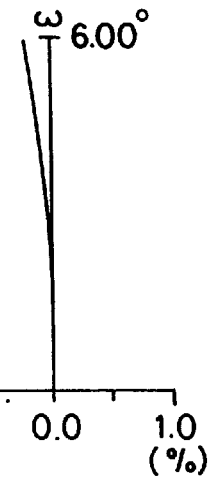
Figure 15D:
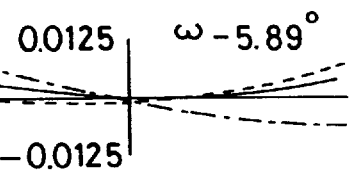
Figure 15E:
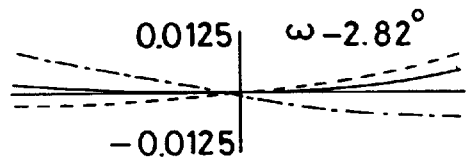
Figure 15F:
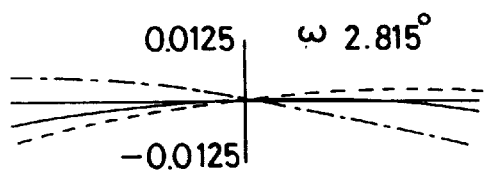
Figure 15G:
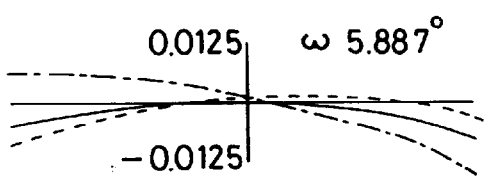
Figure 15H:
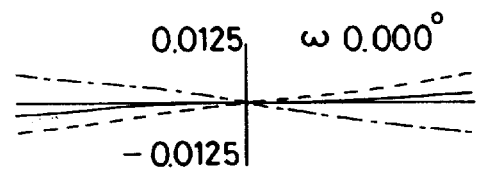
Figure 17A:
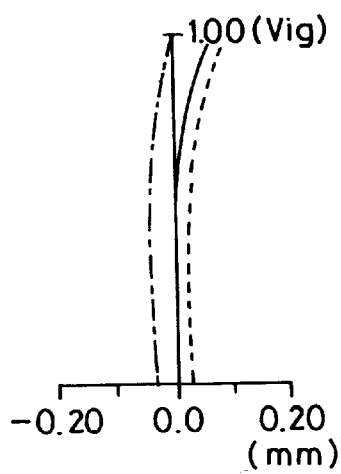
FIG. 17(a)–17(b) are aberration diagrams of the multiple image optics system according to Example 9.
Figure 17B:
Figure 17C:
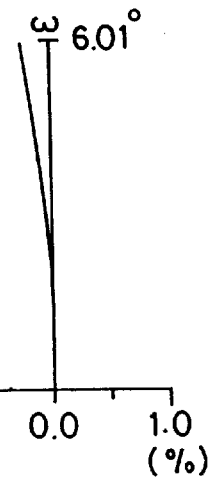
Figure 17D:
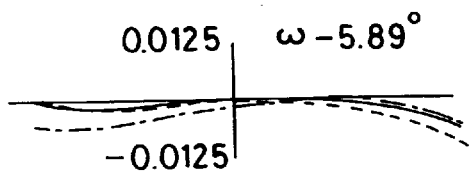
Figure 17E:
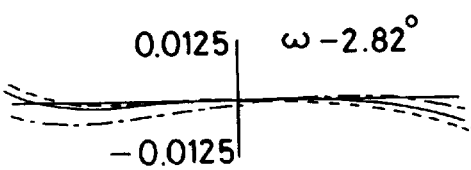
Figure 17F:
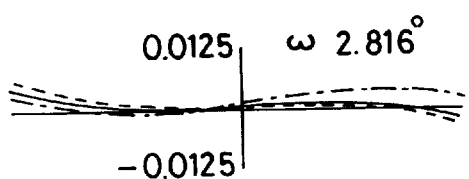
Figure 17G:
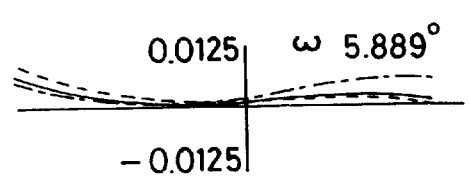
Figure 17H:
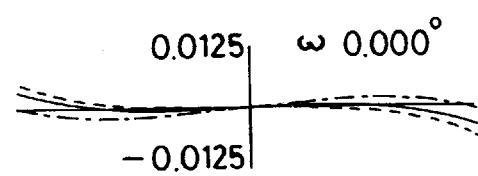
Figure 18A:
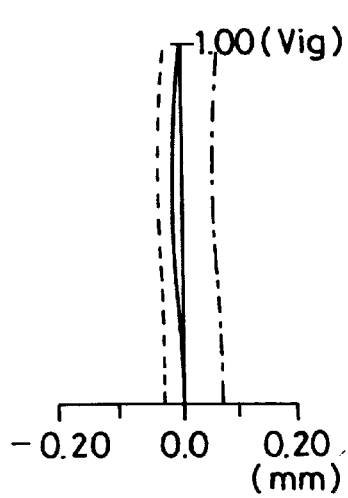
FIG. 18(a)–18(b) are aberration diagrams of the multiple image optics system according to Example 10.
Figure 18B:
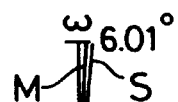
Figure 18C:
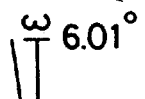
Figure 18D:
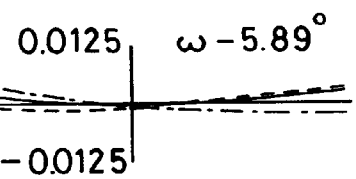
Figure 18E:
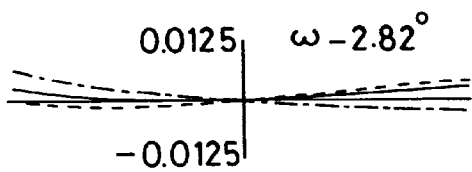
Figure 18F:
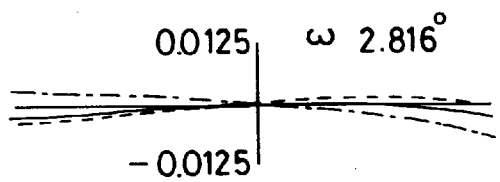
Figure 18G:
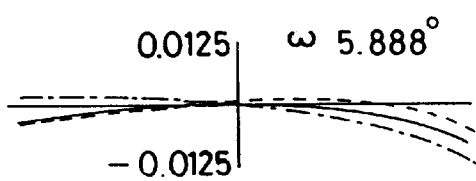
Figure 18H:
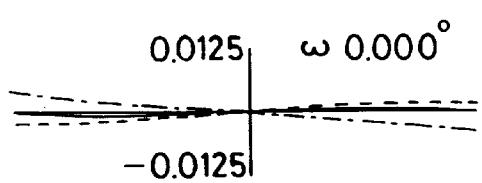
Figure 19A:
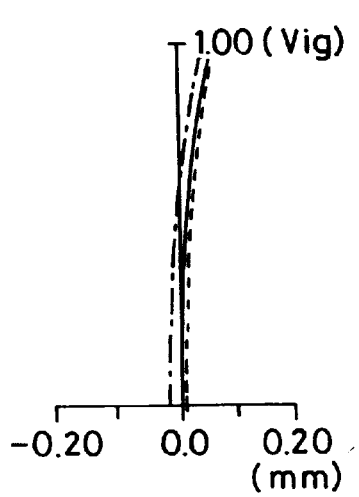
FIG. 19(a)–19(b) are aberration diagrams of the multiple image optics system according to Example 11.
Figure 19B:
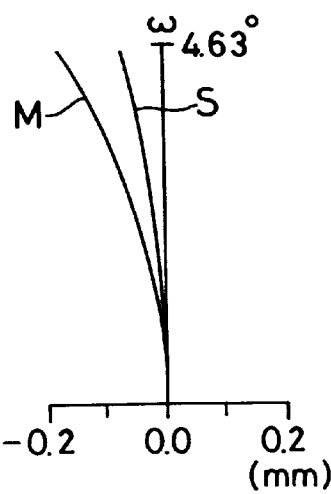
Figure 19C:
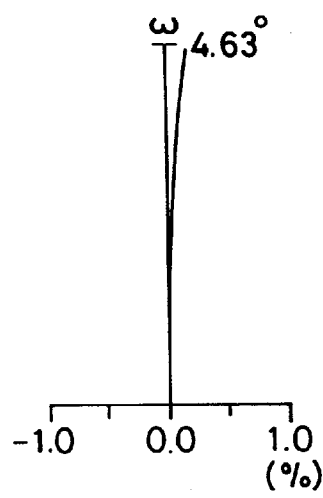
Figure 19D:
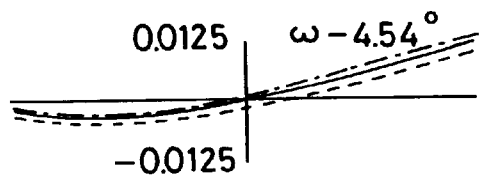
Figure 19E:
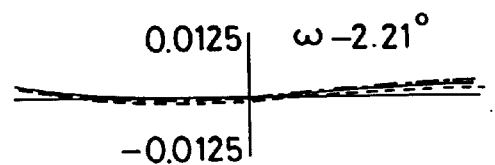
Figure 19F:
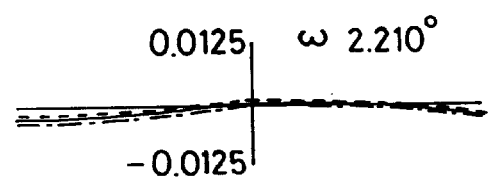
Figure 19G:
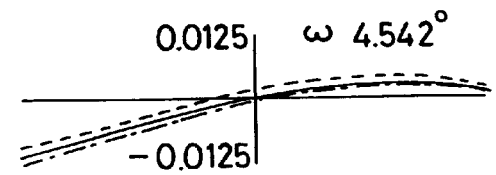
Figure 19H:
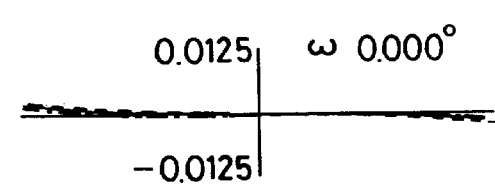

A typical section of the multiple image optics systems according to Examples 6 to 11 is shown in FIG. 8. In all these examples, a Gauss type lens group composed of seven lenses is commonly used as an object-side lens group 1. This Gauss type lens group is composed of a double-convex lens, a double-convex lens, a doublet made up of a double-convex lens and a double-concave lens, a negative meniscus lens convex on the image side thereof, a positive meniscus lens convex on the image side thereof, and a double-convex lens, and provides a lens system which, albeit being bright as expressed by an F-number of 1.2, is well corrected for both chromatic aberration and various aberrations. On the image side of each image optics system, on the other hand, there is located an image-side lens array 2 composed of a radial type of graded index lenses. In FIG. 8 there are shown lens elements 21 arranged on a diagonal line of the image-side lens array 2 wherein 10×10 lens elements are arranged in a square form.

In Example 6, replicated input images 41 are of a size conforming to condition (1), so that effective use can be made of an area allocated to one replicated input image on the spatial light modulator 5 or the like, thereby enabling the number of pixels to be increased. Furthermore, the lens elements 21 in the image-side lens array 2 satisfy condition (4), and so render it possible to make sufficient Petzval sum correction. By conforming to condition (5) it is further possible to make satisfactory correction for axial chromatic aberration, and by conforming well to condition (6), it is possible to achieve a high degree of multiplexing. An aberration diagram of the multiple image optics system according to Example 6 is shown in FIG. 14, from which it is found that chromatic aberrations and various aberration are well corrected although image height is determined by image size complying with condition (1). It is thus possible to achieve a multiple image optics system usable for color images having a multiplicity of pixels, and with white light sources as well.

In Examples 7 to 11, too, conditions (1), (4), (5) and (6) are all satisfied as in Example 6. Aberration diagrams are shown in FIGS. 15 to 19, respectively, from which it is seen that various aberrations are well corrected. It is thus possible to achieve multiple image optics systems usable for operation processing using color images, and with white light sources as well.

Enumerated below are numerical data on Examples 1 to 11. Symbols used hereinafter but not hereinbefore have the following meanings.

$r_1, r_2, \ldots$ radii of curvature of the respective lens surfaces;
$d_1, d_2, \ldots$ separations between the respective lens surfaces;
$n_{c1}, n_{c2}, \ldots$ C-line indices of refraction of the respective lenses;
$n_{d1}, n_{d2}, \ldots$ d-line indices of refraction of the respective lenses; and
$v_{d1}, v_{d2}, \ldots$ Abbe numbers of the respective lenses.

It is to be noted that $r_o$ and $r_i$ represent object and image surfaces, respectively, $d_o$ stands for the separation between the object surface and the first surface of the lens system, and $d_i$ denotes the separation between the final surface of the lens system and the image surface. "GRIN" is an abbreviation of graded index lens with $\beta$ and IH representing magnification and image height, respectively. Finally, $N_{20d}$, $N_{20F}$, and $N_{20C}$ are the fourth-order refractive index profile coefficients with respect to d-, F-, and C-lines, respectively.

Example 1

$r_0 = \infty$     $d_0 = 99.329325$
$r_1 = 491.915$     $d_1 = 1.507147$     $n_{c1} = 1.810042$
$r_2 = -96.83978$     $d_2 = 10$
$r_3 = 12.39611$     $d_3 = 1.2$     $n_{c2} = 1.810042$
$r_4 = \infty$     $d_i = 15.174733$
$r_i = \infty$
$NA_0 = 0.15$ -continued $NA_I = 0.044$
$f_O = 100$
$f_I = 15.86$
$\beta = 0.1586$
$IH = 1.13$
(1) $q/p = 0.8$
(2) $d/r_a = 0.0968$
(6) $NA_O \cdot f_O /(NA_I \cdot f_I) = 21.49$ Example 2

| | | |
|---|---|---|
| $r_0 = \infty$ | $d_0 = 96.524277$ | |
| $r_1 = 210.59274$ | $d_1 = 4.441881$ | $n_{c1} = 1.514322$ |
| $r_2 = -31.03507$ | $d_2 = 1.7$ | $n_{c2} = 1.64209$ |
| $r_3 = -54.86865$ | $d_3 = 20$ | |
| $r_4 = 10.27709$ | $d_4 = 0.95$ | $n_{c3} = 1.513855$ |
| $r_5 = \infty$ | $d_i = 19.37604$ | |
| $r_i = \infty$ | | |

$NA_O = 0.15$
$NA_I = 0.035$
$f_O = 100$
$f_I = 20$
$\beta = -0.2$
$IH = 1.42$
(1) $q/p = 1.0$
(2) $d/r_a = 0.0924$
(6) $NA_O \cdot f_O /(NA_I \cdot f_I) = 21.43$ Example 3

| | | |
|---|---|---|
| $r_0 = \infty$ | $d_0 = 61.9407$ | |
| $r_1 = 66.3792$ | $d_1 = 6.038$ | $n_{c1} = 1.810753$ |
| $r_2 = -68.7$ | $d_2 = 6.3986$ | |
| $r_3 = -33.2868$ | $d_3 = 6.1175$ | $n_{c2} = 1.714361$ |
| $r_4 = 60.121$ | $d_4 = 20.0539$ | |
| $r_5 = -175.1798$ | $d_5 = 6.5098$ | $n_{c3} = 1.725104$ |
| $r_6 = -38.0591$ | $d_6 = 5$ | |
| $r_7 = \infty$ (Stop) | $d_7 = 0.1$ | |
| $r_8 = -2.6918$ | $d_8 = 2.8726$ | GRIN |
| $r_9 = -41.9494$ | $d_i$ 11.44652 | |
| $r_i = \infty$ | | |

GRIN
$N_{00} = 1.6461$
$N_{10} = 0.05013$
$N_{20} = 0.001723$
$NA_O = 0.2$
$NA_I = 0.069$
$f_O = 100$
$f_I = 10$
$\beta = = -0.1$
$IH = 1.42$
(1) $q/p = 1.0$
(3) $N_{10} = -0.05013$
(4) $\phi_s /\phi_m = -0.78$
(6) $NA_O \cdot f_O/(NA_I \cdot f_I) = 28.99$ Example 4

| | | |
|---|---|---|
| $r_0 = \infty$ | $d_0 = 37$ | |
| $r_1 = 545.07031$ | $d_1 = 4$ | $n_{c1} = 1.79387$ |
| $r_2 = -77.35076$ | $d_2 = 0.1$ | |
| $r_3 = 34.125$ | $d_3 = 6.5$ | $n_{c2} = 1.7678$ |
| $r_4 = 121.1521$ | $d_4 = 0.1$ | |
| $r_5 = 29.47525$ | $d_5 = 6$ | $n_{c3} = 1.69297$ |
| $r_6 = 90$ | $d_6 = 1.65$ | $n_{c1} = 1.83653$ |
| $r_7 = 20.41626$ | $d_7 = 17.7$ | |
| $r_8 = -20.50968$ | $d_8 = 1.7$ | $n_{c2} = 1.73244$ |
| $r_9 = -88.94227$ | $d_9 = 1.5$ | |
| $r_{10} = -52.65471$ | $d_{10} = 6$ | $n_{c3} = 1.82738$ |
| $r_{11} = -28.76891$ | $d_{11} = 0.1$ | |
| $r_{12} = -827.04877$ | $d_{12} = 5.5$ | $n_{c2} = 1.82898$ |
| $r_{13} = -62.73182$ | $d_{13} = 10$ | |
| $r_{14} = \infty$ (Stop) | $d_{14} = 0.07$ | |
| $r_{15} = -2.6946$ | $d_{15} = 2.8718$ | GRIN |
| $r_{16} = -36.0265$ | $d_i = 11.47274$ | |
| $r_i = \infty$ | | |

GRIN
$N_{00} = 1.6461$
$N_{10} = 0.04962$
$N_{20} = 0.001683$
$NA_O = 0.385$
$NA_I = 0.065$
$f_O = 52$

-continued $f_I = 10$
$\beta = -0.1923$
$IH = 1.42$
(1) $q/p = 1.0$
(3) $N_{10} = -0.04962$
(4) $\phi_s/\phi_m = -0.78$
(6) $NA_O \cdot f_O/(NA_I \cdot f_I) = 30.77$ Example 5

| | | | |
|---|---|---|---|
| $r_0 = \infty$ | $d_1 = 96.524$ | | |
| $r_1 = 210.593$ | $d_2 = 4.442$ | $n_{d1} = 1.5168$ | $\nu_{d1} = 64.12$ |
| $r_2 = -31.035$ | $d_2 = 1.700$ | $n_{d2} = 1.64769$ | $\mu_{d2} = 33.80$ |
| $r_3 = -54.869$ | $d_3 = 5.000$ | | |
| $r_4 = \infty$ (Stop) | $d_4 = 0.096$ | | |
| $r_5 = -2.695$ | $d_5 = 2.871$ | GRIN | |
| $r_6 = -36.027$ | $d_i = 11.471$ | | |
| $r_i = \infty$ | | | |

GRIN

| | | |
|---|---|---|
| $N_{000} = 1.6461$ | $N_{00d} = 1.65$ | $N_{00F} = 1.6591$ |
| $N_{100} = -0.04962$ | $N_{10d} = -0.04981$ | $N_{10F} = -0.05025$ |
| $N_{200} = 0.001683$ | $N_{20d} = 0.001685$ | $N_{20F} = 0.001688$ |

$V_{00} = 50.00$
$V_{10} = 79.06$
$NA_O = 0.152$
$NA_I = 0.070$
$f_O = 100.0$
$f_I = 10.0$
$\beta = -0.200$
$IH = 1.420$
(1) $q/p = 1.0$
(3) $N_{10} = -0.04981$ (d-line)
(4) $\phi_s = -0.223$
　　$\phi_m = 0.286$
　　$\phi_s/\phi_m = -0.780$
(5) $V_{00} = 50.0$
　　$V_{10} = 79.06$
(6) $NA_O \cdot f_O/(NA_I \cdot f_I) = 21.64$ Example 6

| | | | |
|---|---|---|---|
| $r_0 = \infty$ | $d_1 = 28.574$ | | |
| $r_1 = 363.534$ | $d_1 = 10.520$ | $n_{d1} = 1.79952$ | $\nu_{d1} = 42.24$ |
| $r_2 = -57.485$ | $d_2 = 0.100$ | | |
| $r_3 = 44.559$ | $d_3 = 7.778$ | $n_{d2} = 1.7725$ | $\nu_{d2} = 49.58$ |
| $r_4 = -1342.402$ | $d_4 = 0.100$ | | |
| $r_5 = 29.301$ | $d_5 = 8.351$ | $n_{d3} = 1.6968$ | $\nu_{d3} = 55.48$ |
| $r_6 = -28232.124$ | $d_6 = 3.200$ | $n_{d4} = 1.84666$ | $\nu_{d4} = 23.88$ |
| $r_7 = 19.554$ | $d_7 = 14.329$ | | |
| $r_8 = -21.384$ | $d_8 = 9.766$ | $n_{d5} = 1.74$ | $\nu_{d5} = 28.29$ |
| $r_9 = -364.795$ | $d_9 = 1.423$ | | |
| $r_{10} = -74.235$ | $d_{10} = 8.817$ | $n_{d6} = 1.834$ | $\nu_{d6} = 37.20$ |
| $r_{11} = -39.669$ | $d_{11} = 0.100$ | | |
| $r_{12} = 406.780$ | $d_{12} = 7.766$ | $n_{d7} = 1.83481$ | $\nu_{d7} = 42.79$ |
| $r_{13} = -74.063$ | $d_{13} = 10.000$ | | |
| $r_{14} = \infty$ (Stop) | $d_{14} = 0.096$ | | |
| $r_{15} = -2.794$ | $d_{15} = 2.871$ | GRIN | |
| $r_{16} = -21.697$ | $d_{16} = 11.512$ | | |
| $r_i = \infty$ | | | |

GRIN

| | | |
|---|---|---|
| $N_{000} = 1.6443$ | $N_{00d} = 1.65$ | $N_{00F} = 1.663$ |
| $N_{100} = -0.04616$ | $N_{10d} = -0.0464$ | $N_{10F} = -0.04696$ |
| $N_{200} = 0.001353$ | $N_{20d} = 0.001354$ | $N_{20F} = 0.001357$ |

$V_{00} = 34.76$
$V_{10} = 58$
$NA_O = 0.417$
$NA_I = 0.070$
$f_O = 50.0$
$f_I = 10.0$
$\beta = -0.200$
$IH = 1.420$
(1) $q/p = 1.0$
(3) $N_{10} = -0.0464$
(4) $\phi_s = -0.203$
　　$\phi_m = 0.266$
　　$\phi_s/\phi_m = -0.761$
(5) $V_{00} = 34.76$
　　$V_{10} = 58.00$
(6) $NA_O \cdot f_O/(NA_I \cdot f_I) = 29.75$ Example 7

| | |
|---|---|
| $r_0 = \infty$ | $d_1 = 28.574$ |

-continued

| | | | |
|---|---|---|---|
| $r_1 = 363.534$ | $d_2 = 10.520$ | $n_{d1} = 1.79952$ | $\nu_{d1} = 42.24$ |
| $r_2 = -57.485$ | $d_2 = 0.100$ | | |
| $r_3 = 44.559$ | $d_3 = 7.778$ | $n_{d2} = 1.7725$ | $\nu_{d2} = 49.58$ |
| $r_4 = -1342.402$ | $d_4 = 0.100$ | | |
| $r_5 = 29.301$ | $d_5 = 8.351$ | $n_{d3} = 1.6968$ | $\nu_{d3} = 55.48$ |
| $r_6 = -28232.124$ | $d_6 = 3.200$ | $n_{d4} = 1.84666$ | $\nu_{d4} = 23.88$ |
| $r_7 = 19.554$ | $d_7 = 14.329$ | | |
| $r_8 = -21.384$ | $d_8 = 9.766$ | $n_{d5} = 1.74$ | $\nu_{d5} = 28.29$ |
| $r_9 = -364.795$ | $d_9 = 1.423$ | | |
| $r_{10} = -74.235$ | $d_{10} = 8.817$ | $n_{d6} = 1.834$ | $\nu_{d6} = 37.20$ |
| $r_{11} = -39.669$ | $d_{11} = 0.100$ | | |
| $r_{12} = 406.780$ | $d_{12} = 7.766$ | $n_{d7} = 1.83481$ | $\nu_{d7} = 42.79$ |
| $r_{13} = -74.063$ | $d_{13} = 10.000$ | | |
| $r_{14} = \infty$ (Stop) | $d_{14} = 0.096$ | | |
| $r_{15} = -2.731$ | $d_{15} = 2.871$ | GRIN | |
| $r_{16} = -24.667$ | $d_i = 11.612$ | | |
| $r_i = \infty$ | | | |

GRIN
$N_{00d} = 1.6443$   $N_{00d} = 1.65$   $N_{00F} = 1.663$
$N_{10d} = -0.04486$   $N_{10d} = 0.04503$   $N_{10F} = 0.04543$
$N_{20d} = 0.001234$   $N_{20d} = 0.001235$   $N_{20F} = 0.001238$
$V_{00} = 34.76$
$V_{10} = 79$
$NA_0 = 0.417$
$NA_I = 0.067$
$f_0 = 50.0$
$f_I = 10.0$
$\beta = -0.2$
IH = 1.42
(1) q/p = 1.0
(3) $N_{10} = -0.04503$
(4) $\phi_s = -0.212$
    $\phi_m = 0.259$
    $\phi_s/\phi_m = -0.819$
(5) $V_{00} = 34.76$
    $V_{10} = 79$
(6) $NA_0 \cdot f_0/(NA_I \cdot f_I) = 31.15$ Example 8

| | | | |
|---|---|---|---|
| $r_0 = \infty$ | $d_1 = 28.574$ | | |
| $r_1 = 363.534$ | $d_1 = 10.520$ | $n_{d1} = 1.79952$ | $\nu_{d1} = 42.24$ |
| $r_2 = -57.485$ | $d_2 = 0.100$ | | |
| $r_3 = 44.559$ | $d_3 = 7.778$ | $n_{d2} = 1.7725$ | $\nu_{d2} = 49.58$ |
| $r_4 = -1342.402$ | $d_4 = 0.100$ | | |
| $r_5 = 29.301$ | $d_5 = 8.351$ | $n_{d3} = 1.6968$ | $\nu_{d3} = 55.48$ |
| $r_6 = -28232.124$ | $d_6 = 3.200$ | $n_{d4} = 1.84666$ | $\nu_{d4} = 23.88$ |
| $r_7 = 19.554$ | $d_7 = 14.329$ | | |
| $r_8 = -21.384$ | $d_8 = 9.766$ | $n_{d5} = 1.74$ | $\nu_{d5} = 28.28$ |
| $r_9 = -364.795$ | $d_9 = 1.423$ | | |
| $r_{10} = -74.235$ | $d_{10} = 8.817$ | $n_{d6} = 1.834$ | $\nu_{d6} = 37.20$ |
| $r_{11} = -39.669$ | $d_{11} = 0.100$ | | |
| $r_{12} = 406.780$ | $d_{12} = 7.766$ | $n_{d7} = 1.83481$ | $\nu_{d7} = 42.79$ |
| $r_{13} = -74.063$ | $d_{13} = 10.000$ | | |
| $r_{14} = \infty$ (Stop) | $d_{14} = 0.096$ | | |
| $r_{15} = -2.717$ | $d_{15} = 2.873$ | GRIN | |
| $r_{16} = -46.652$ | $d_i = 11.411$ | | |
| $r_i = \infty$ | | | |

GRIN
$N_{00d} = 1.64557$   $N_{00d} = 1.65$   $N_{00F} = 1.66034$
$N_{10d} = -0.05012$   $N_{10d} = -0.05033$   $N_{10F} = -0.05083$
$N_{20d} = 0.001758$   $N_{20d} = 0.00176$   $N_{20F} = 0.001764$
$V_{00} = 44.01$
$V_{10} = 70.89$
$NA_0 = 0.417$
$NA_I = 0.070$
$f_0 = 50.0$
$f_I = 10.0$
$\beta = -0.2$
IH = 1.42
(1) q/p = 1.0
(3) $N_{10} = -0.5033$
(4) $\phi_s = -0.225$
    $\phi_m = 0.289$
    $\phi_s/\phi_m = -0.779$
(5) $V_{00} = 44.01$
    $V_{10} = 70.89$
(6) $NA_0 \cdot f_0/(NA_I \cdot f_I) = 29.76$ Example 9

$r_0 = \infty$   $d_1 = 28.574$

-continued

| | | | |
|---|---|---|---|
| $r_1 = 363.534$ | $d_1 = 10.520$ | $n_{d1} = 1.79952$ | $\nu_{d1} = 42.24$ |
| $r_2 = -57.485$ | $d_2 = 0.100$ | | |
| $r_3 = 44.559$ | $d_3 = 7.778$ | $n_{d2} = 1.7725$ | $\nu_{d2} = 49.58$ |
| $r_4 = -1342.402$ | $d_4 = 0.100$ | | |
| $r_5 = 29.301$ | $d_5 = 8.351$ | $n_{d3} = 1.6968$ | $\nu_{d3} = 55.48$ |
| $r_6 = -28232.124$ | $d_6 = 3.200$ | $n_{d4} = 1.84666$ | $\nu_{d4} = 23.88$ |
| $r_7 = 19.554$ | $d_7 = 14.329$ | | |
| $r_8 = -21.384$ | $d_8 = 9.766$ | $n_{d5} = 1.74$ | $\nu_{d5} = 28.29$ |
| $r_9 = -364.795$ | $d_9 = 1.423$ | | |
| $r_{10} = -74.235$ | $d_{10} = 8.817$ | $n_{d6} = 1.834$ | $\nu_{d6} = 37.20$ |
| $r_{11} = -39.669$ | $d_{11} = 0.100$ | | |
| $r_{12} = 406.780$ | $d_{12} = 7.766$ | $n_{d7} = 1.83481$ | $\nu_{d7} = 42.79$ |
| $r_{13} = -74.063$ | $d_{13} = 10.000$ | | |
| $r_{14} = \infty$ (Stop) | $d_{14} = 0.096$ | | |
| $r_{15} = -2.598$ | $d_{15} = 3.336$ | GRIN | |
| $r_{16} = 25.150$ | $d_i = 11.295$ | | |
| $r_i = \infty$ | | | |

GRIN
| | | |
|---|---|---|
| $N_{00O} = 1.6461$ | $N_{00d} = 1.65$ | $N_{00F} = 1.6591$ |
| $N_{10O} = -0.05012$ | $N_{10d} = -0.05035$ | $N_{10F} = -0.05088$ |
| $N_{20O} = 0.002002$ | $N_{20d} = 0.002004$ | $N_{20F} = 0.002008$ |

$V_{00} = 50.00$
$V_{10} = 66.25$
$NA_0 = 0.417$
$NA_I = 0.067$
$f_0 = 50.0$
$f_I = 10.0$
$\beta = -0.2$
$IH = 1.42$
(1) $q/p = 1.0$
(3) $N_{10} = -0.05035$
(4) $\phi_s = -0.276$
    $\phi_m = 0.336$
    $\phi_s/\phi_m = -0.822$
(5) $V_{00} = 50.0$
    $V_{10} = 66.25$
(6) $NA_0 \cdot f_0/(NA_I \cdot f_I) = 31.23$ Example 10

| | | | |
|---|---|---|---|
| $r_0 = \infty$ | $d_1 = 28.574$ | | |
| $r_1 = 363.534$ | $d_1 = 10.520$ | $n_{d1} = 1.79952$ | $\nu_{d1} = 42.24$ |
| $r_2 = -57.485$ | $d_2 = 0.100$ | | |
| $r_3 = 44.559$ | $d_3 = 7.778$ | $n_{d2} = 1.7725$ | $\nu_{d2} = 49.58$ |
| $r_4 = -1342.402$ | $d_4 = 0.100$ | | |
| $r_5 = 29.301$ | $d_5 = 8.351$ | $n_{d3} = 1.6968$ | $\nu_{d3} = 55.48$ |
| $r_6 = -28232.124$ | $d_6 = 3.200$ | $n_{d4} = 1.84666$ | $\nu_{d4} = 23.88$ |
| $r_7 = 19.554$ | $d_7 = 14.329$ | | |
| $r_8 = -21.384$ | $d_8 = 9.766$ | $n_{d5} = 1.74$ | $\nu_{d5} = 28.29$ |
| $r_9 = -364.795$ | $d_9 = 1.423$ | | |
| $r_{10} = -74.235$ | $d_{10} = 8.817$ | $n_{d6} = 1.834$ | $\nu_{d6} = 37.20$ |
| $r_{11} = -39.669$ | $d_{11} = 0.100$ | | |
| $r_{12} = 406.780$ | $d_{12} = 7.766$ | $n_{d7} = 1.83481$ | $\nu_{d7} = 42.79$ |
| $r_{13} = -74.063$ | $d_{13} = 10.000$ | | |
| $r_{14} = \infty$ (Stop) | $d_{14} = 0.096$ | | |
| $r_{15} = -2.663$ | $d_{15} = 2.860$ | GRIN | |
| $r_{16} = -34.507$ | $d_i = 11.499$ | | |
| $r_i = \infty$ | | | |

GRIN
| | | |
|---|---|---|
| $N_{00O} = 1.6461$ | $N_{00d} = 1.65$ | $N_{00F} = 1.6591$ |
| $N_{10O} = -0.05009$ | $N_{10d} = -0.05024$ | $N_{10F} = -0.05059$ |
| $N_{20O} = 0.001683$ | $N_{20d} = 0.001684$ | $N_{20F} = 0.001688$ |

$V_{00} = 50.00$
$V_{10} = 100.48$
$NA_0 = 0.417$
$NA_I = 0.067$
$f_0 = 50.0$
$f_I = 10.0$
$\beta = -0.2$
$IH = 1.42$
(1) $q/p = 1.0$
(3) $N_{10} = -0.05024$
(4) $\phi_s = -0.225$
    $\phi_m = 0.287$
    $\phi_s/\phi_m = -0.784$
(5) $V_{00} = 50.0$
    $V_{10} = 100.48$
(6) $NA_0 \cdot f_0/(NA_I \cdot f_I) = 31.23$ Example 11

| | |
|---|---|
| $r_0 = \infty$ | $d_1 = 28.574$ |

-continued

| | | | |
|---|---|---|---|
| $r_1 = 363.534$ | $d_1 = 10.520$ | $n_{d1} = 1.79952$ | $\nu_{d1} = 42.24$ |
| $r_2 = -57.485$ | $d_2 = 0.100$ | | |
| $r_3 = 44.559$ | $d_3 = 7.778$ | $n_{d2} = 1.7725$ | $\nu_{d2} = 49.58$ |
| $r_4 = -1342.402$ | $d_4 = 0.100$ | | |
| $r_5 = 29.301$ | $d_5 = 8.351$ | $n_{d3} = 1.6968$ | $\nu_{d3} = 55.48$ |
| $r_6 = -28232.124$ | $d_6 = 3.200$ | $n_{d4} = 1.84666$ | $\nu_{d4} = 23.88$ |
| $r_7 = 19.554$ | $d_7 = 14.329$ | | |
| $r_8 = -21.384$ | $d_8 = 9.766$ | $n_{d5} = 1.74$ | $\nu_{d5} = 28.29$ |
| $r_9 = -364.795$ | $d_9 = 1.423$ | | |
| $r_{10} = -74.235$ | $d_{10} = 8.817$ | $n_{d6} = 1.834$ | $\nu_{d6} = 37.20$ |
| $r_{11} = -39.669$ | $d_{11} = 0.100$ | | |
| $r_{12} = 406.780$ | $d_{12} = 7.766$ | $n_{d7} = 1.83481$ | $\nu_{d7} = 42.79$ |
| $r_{13} = -74.063$ | $d_{13} = 10.000$ | | |
| $r_{14} = \infty$ (Stop) | $d_{14} = 0.000$ | | |
| $r_{15} = \infty$ | $d_{15} = 1.458$ | GRIN | |
| $r_{16} = \infty$ | $d_i = 9.691$ | | |
| $r_i = \infty$ | | | |
| GRIN | | | |
| $N_{000} = 1.6461$ | $N_{00d} = 1.65$ | $N_{00F} = 1.6591$ | |
| $N_{100} = -0.0431$ | $N_{10d} = 0.03433$ | $N_{10F} = -0.03438$ | |
| $N_{200} = 0.000451$ | $N_{20d} = 0.000452$ | $N_{20F} = 0.000453$ | |
| $V_{00} = 50.00$ | | | |
| $V_{10} = 490.43$ | | | |
| $NA_O = 0.417$ | | | |
| $NA_I = 0.049$ | | | |
| $f_O = 50.0$ | | | |
| $f_I = 10.0$ | | | |
| $\beta = -0.2$ | | | |
| IH = 1.136 | | | |
| (1) $q/p = 0.8$ | | | |
| (3) $N_{10} = -0.03433$ | | | |
| (5) $V_{00} = 50.0$ | | | |
| $\quad V_{10} = 490$ | | | |
| (6) $NA_O \cdot f_O/(NA_I \cdot f_I) = 42.24$ | | | |

The aberration diagrams of the aforesaid Examples 1 to 11 are shown in FIGS. 9 to 19. In each diagram (a), (b), (c), and (d) represent spherical aberration, astigmatism, distortion, and transverse aberration, respectively, and ω denotes a field angle.

As can be understood from the foregoing explanation, the present invention enables the degree of multiplexing and image size to be so increased that it is possible to achieve a multiple image optics system that can process images comprising an increased number of pixels, perform advanced and high-speed operation, and is usable for color images comprising an increased number of pixels, and with white light sources as well.

What we claim is:

1. An optical apparatus for forming a plurality of images of an object, comprising:

an object-side lens group on an object side thereof which collimates a bundle of light from the object; and an image-side lens array on an image side thereof which forms a plurality of images of the object from said collimated bundle of light, and satisfying the following condition (1):

$$0.8 \leq q/p \leq 1.0 \tag{1}$$

where p represents an intercentral distance between any replicated input image within an array of input images replicated on a back focal plane of the image-side lens array and a replicated input image nearest thereto, and q is a length of a segment of a line passing through centers of both said replicated input images which is cut off by one replicated input image.

2. An optical apparatus for forming a plurality of images of an object, comprising:

an object-side lens group on an object side thereof; and
an image-side lens array on an image side thereof, and satisfying the following condition (1):

$$0.8 \leq q/p \leq 1.0 \tag{1}$$

where p represents an intercentral distance between any replicated input image within an array of input images replicated on a back focal plane of the image-side lens array and a replicated input image nearest thereto, and q is a length of a segment of a line passing through centers of both said replicated input images, which is cut off by one replicated input image, wherein each lens element of said image-side lens array satisfies the following condition (2):

$$0.08 < d/r_a < 0.1 \tag{2}$$

where d is a lens thickness of each lens element, and $r_a$ is a radius of curvature of an object-side surface of each lens element.

3. An optical apparatus for forming a plurality of images of an object, comprising:

an object-side lens group on an object side thereof; and
an image-side lens array on an image side thereof, and satisfying the following condition (1):

$$0.8 \leq q/p \leq 1.0 \tag{1}$$

where p represents an intercentral distance between any replicated input image within an array of input images replicated on a back focal plane of the image-side lens array and a replicated input image nearest thereto, and q is a length of a segment of a line passing through centers of both said replicated input images, which is cut off by one replicated input image, wherein lens elements of said image-side lens array are radial type of graded index lenses represented by the following equation (a) and satisfying the following condition (3):

$$N(r) = N_{00} + N_{10}r^2 + N_{20}r^4 + \ldots \quad (a)$$

$$N_{10} < 0 \quad (3)$$

where r is a distance of the radial type of graded index lens, as viewed from an optical axis thereof in a radial direction, N(r) is a refractive index of the radial type of graded index lens at the distance r, $N_{00}$ is a refractive index of the radial type of graded index lens on an optical axis thereof, and $N_{10}$ and $N_{20}$ are second- and fourth-order refractive index profile coefficients of the radial type of graded index lens, respectively.

4. An optical apparatus for forming a plurality of images of an object, comprising:

an object-side lens group on an object side thereof; and an image-side lens array on an image side thereof, and satisfying the following condition (1):

$$0.8 \leq q/p \leq 1.0 \quad (1)$$

where p represents an intercentral distance between any replicated input image within an array of input images replicated on a back focal plane of the image-side lens array and a replicated input image nearest thereto, and q is a length of a segment of a line passing through centers of both said replicated input images, which is cut off by one replicated input image, wherein lens elements of said image-side lens array are radial type of graded index lenses represented by the following equation (a) and satisfying the following condition (4):

$$N(r) = N_{00} + N_{10}r^2 + N_{20}r^4 + \ldots \quad (a)$$

$$-1 < \phi_s/\phi_m < -0.6 \quad (4)$$

where r is a distance of the radial type of graded index lens, as viewed from an optical axis thereof in a radial direction, N(r) is a refractive index of the radial type of graded index lens at the distance r, $N_{00}$ is a refractive index of the radial type of graded index lens on an optical axis thereof, $N_{10}$ and $N_{20}$ are second- and fourth-order refractive index profile coefficients of the radial type of graded index lens, respectively, and $\phi_s$, and $\phi_m$ are refracting powers of the radial type of graded index lens by surface and medium, respectively.

5. An optical apparatus for forming a plurality of images of an object, comprising:

an object-side lens group on an object side thereof; and an image-side lens array on an image side thereof, and satisfying the following condition (1):

$$0.8 \leq q/p \leq 1.0 \quad (1)$$

where p represents an intercentral distance between any replicated input image within an array of input images replicated on a back focal plane of the image-side lens array and a replicated input image nearest thereto, and q is a length of a segment of a line passing through centers of both said replicated input images, which is cut off by one replicated input image, wherein lens elements of said image-side lens array are radial type of graded index lenses represented by the following equation (a) and satisfying the following condition (5):

$$N(r) = N_{00} + N_{10}r^2 + N_{20}r^4 + \ldots \quad (a)$$

$$V_{10}^{-1} < V_{00}^{-1} \quad (5)$$

where r is a distance of the radial type of graded index lens, as viewed from an optical axis thereof in a radial direction, N(r) is a refractive index of the radial type of graded index lens at the distance r, $N_{00}$ is a refractive index of the radial type of graded index lens on an optical axis thereof, $N_{10}$ and $N_{20}$ are second- and fourth-order refractive index profile coefficients of the radial type of graded index lens, respectively, and $V_{00}$ and $V_{10}$ are dispersions of the radial type of graded index lens, as given by the following equations (b) and (c), respectively:

$$V_{00} = (N_{00d} - 1)/(N_{00F} - N_{00C}) \quad (b)$$

$$V_{10} = N_{10d}/(N_{10F} - N_{10C}) \quad (c)$$

where $N_{00d}$, $N_{00F}$, and $N_{00C}$ are axial refractive indices of the radial type of graded index lens with respect to d-, F-, and C-lines, respectively, and $N_{10d}$, $N_{10F}$, and $N_{10C}$ are second-order refractive index profile coefficients of the radial type of graded index lens with respect to d-, F-, and C-lines, respectively.

6. An optical apparatus for forming a plurality of images of an object, comprising:

an object-side lens group on an object side thereof; and an image-side lens array on an image side thereof, and satisfying the following condition (1):

$$0.8 \leq q/p \leq 1.0 \quad (1)$$

where p represents an intercentral distance between any replicated input image within an array of input images replicated on a back focal plane of the image-side lens array and a replicated input image nearest thereto, and q is a length of a segment of a line passing through centers of both said replicated input images, which is cut off by one replicated input image, wherein said multiple image optics system is characterized by complying with the following condition (6):

$$20 < NA_O \cdot f_O/(NA_I \cdot f_I) \quad (6)$$

where $NA_O$, and $NA_I$, are numerical apertures of the object-side lens group and the image-side lens array, respectively, and $f_O$ and $f_I$ are focal lengths of the object-side lens group and the image-side lens array, respectively.

\* \* \* \* \*

UNITED STATES PATENT AND TRADEMARK OFFICE
CERTIFICATE OF CORRECTION

PATENT NO. : 6,016,224
DATED : Jan. 18, 2000
INVENTOR(S) : Mitsuru NAMIKI

It is certified that error appears in the above-indentified patent and that said Letters Patent is hereby corrected as shown below:

Column 22, line 9, "$V_{10}^{-1} < V_{00}^{31\ 1}$"

to

--$V_{10}^{-1} < V_{00}^{-1}$--.

Signed and Sealed this

Sixth Day of March, 2001

Attest:

NICHOLAS P. GODICI

*Attesting Officer*  *Acting Director of the United States Patent and Trademark Office*